United States Patent [19]

Hughes, Jr.

[11] 4,164,353
[45] Aug. 14, 1979

[54] TOY PHONOGRAPH APPARATUS

[75] Inventor: Alexander W. Hughes, Jr., Oceanport, N.J.

[73] Assignee: Janex Corporation, Eatontown, N.J.

[21] Appl. No.: 867,331

[22] Filed: Jan. 6, 1978

[51] Int. Cl.² .................... G11B 17/06; G11B 3/00
[52] U.S. Cl. ................................. 274/1 A; 274/15 R
[58] Field of Search ................ 274/1 A, 9 R, 15 R

[56] References Cited

U.S. PATENT DOCUMENTS

| | | | |
|---|---|---|---|
| 2,506,925 | 5/1950 | Johnson | 274/10 C |
| 2,858,378 | 10/1958 | Goldmark | 179/100.4 |
| 3,017,187 | 1/1962 | Ryan | 274/1 A |
| 3,055,664 | 9/1962 | Curci | 274/15 R |
| 3,208,755 | 9/1965 | Lieberman | 274/1 A |
| 3,286,396 | 11/1966 | Ryan | 40/232 |
| 3,401,942 | 9/1968 | Strauss | 274/1 A |
| 3,411,790 | 11/1968 | Suchowski | 274/9 R |
| 3,467,393 | 9/1969 | Kuwayama | 274/1 A |
| 3,538,638 | 10/1970 | Glass et al. | 274/1 A |
| 3,589,735 | 6/1971 | Watanabe | 274/15 R |
| 3,682,484 | 8/1972 | Watanabe | 274/1 A |
| 3,721,449 | 3/1973 | Sirinek | 274/1 A |
| 3,784,210 | 1/1974 | Fox et al. | 274/1 A |
| 3,984,111 | 10/1976 | Hughes | 274/1 S R |
| 4,055,351 | 10/1977 | Hughes | 274/1 A |

Primary Examiner—Richard E. Aegerter
Assistant Examiner—John W. Shepperd
Attorney, Agent, or Firm—Hubbell, Cohen, Stiefel & Gross

[57] ABSTRACT

An improved toy phonograph of the type in which a pickup arm is pivoted at one end and is engageable with a playing surface of a first phonograph record rotatably mounted on one side of the turntable, with a first spring urging the pickup arm toward the periphery of the phonograph record and with a first speaker cone means resiliently mounted on the housing of the phonograph record above the pickup arm and having a lift bar means removably engageable with the pickup arm in sound reproducing contact, includes an arrangement for resiliently pressing the pickup arm into engagement with the phonograph record for reproducing recorded sounds from the phonograph record playing surface during rotation of the turntable, with this pressing arrangement substantially uniformly resiliently biasing the lift bar against the pickup arm with a substantially uniform biasing force for exerting substantially uniform pressure on the pickup arm needle throughout the entire path of travel circumscribed by the needle across the phonograph record playing surface from the periphery towards the center during such sound reproducing engagement. This pressing arrangement comprises a bifurcated spring member resiliently pressing against the lift bar at a pair of spaced apart positions therealong and further includes another spring resiliently pressing against the bifurcated spring member for enabling adjustment of the biasing force provided by the bifurcated spring member as a result of adjustment of the biasing force of the other spring. This improved toy phonograph may be used in either a single play or continuous play arrangement with the substantially uniform pressure on the lift bar ensuring positive shut-off in the single play arrangement.

25 Claims, 17 Drawing Figures

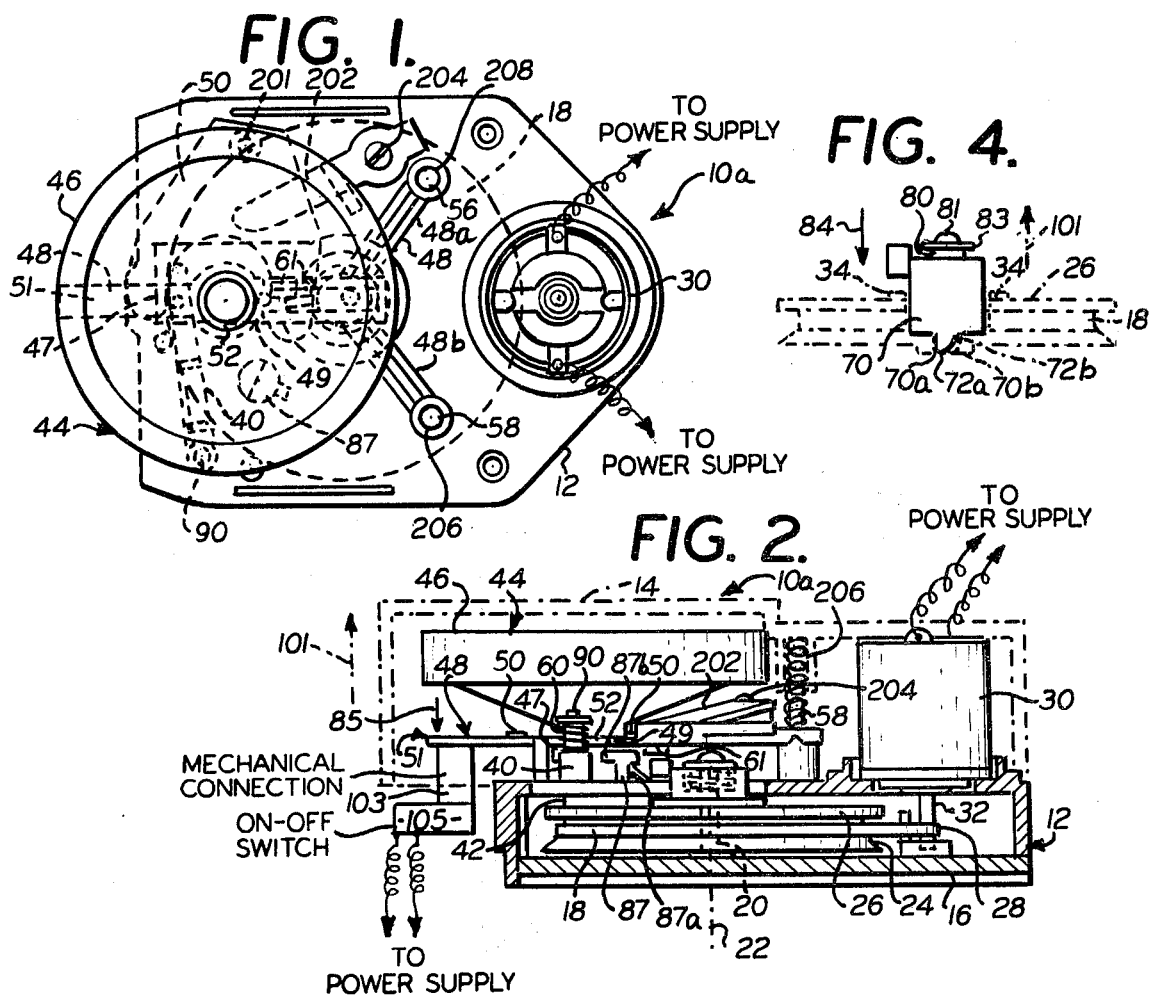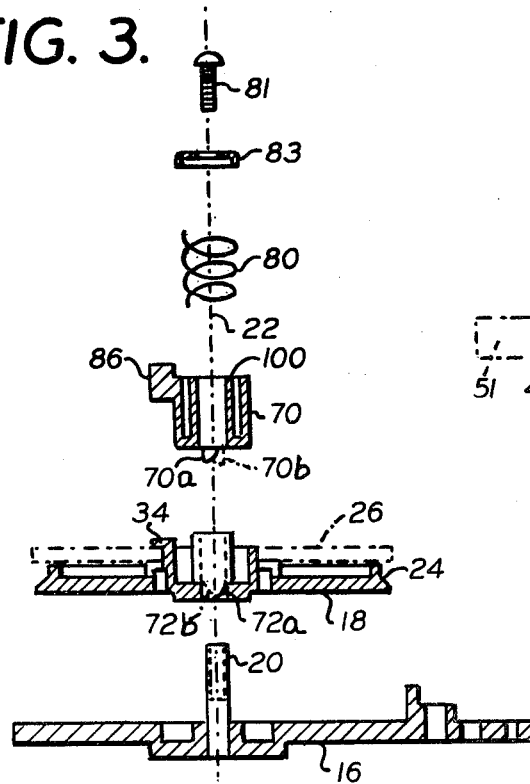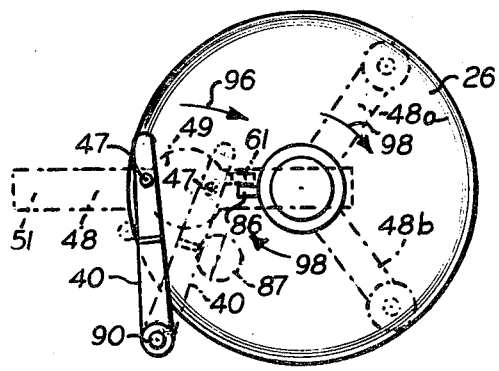

FIG. 9.
FIG. 10.
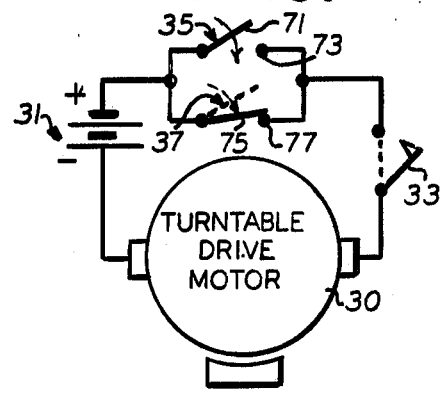
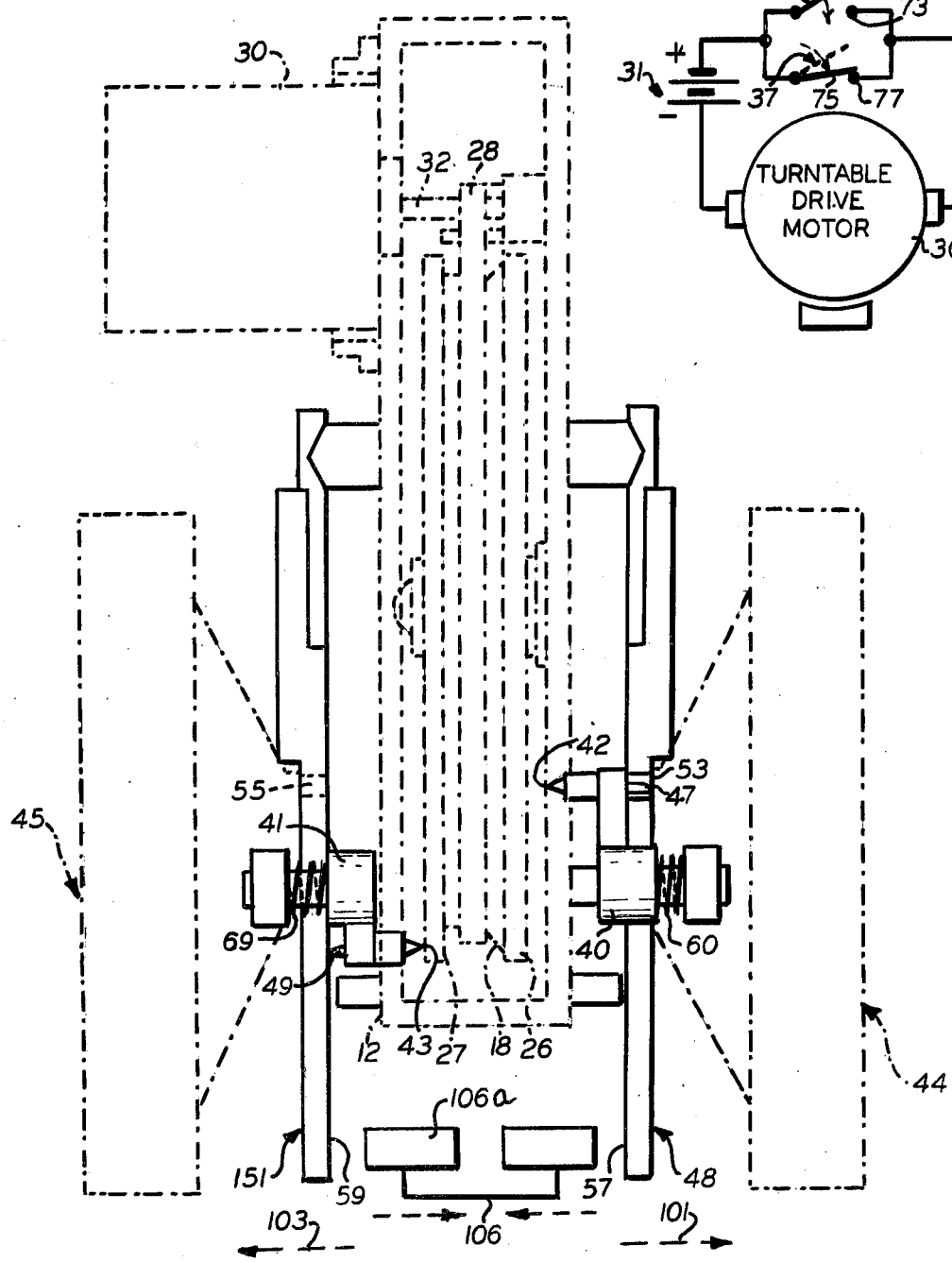
FIG. 11.
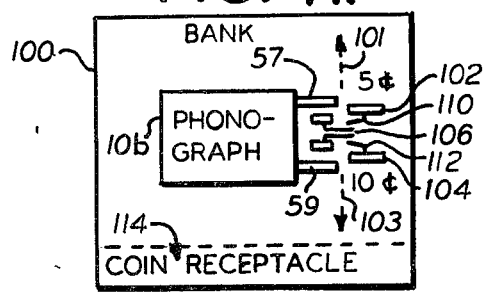

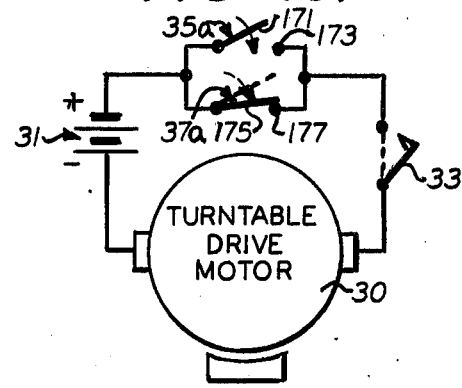
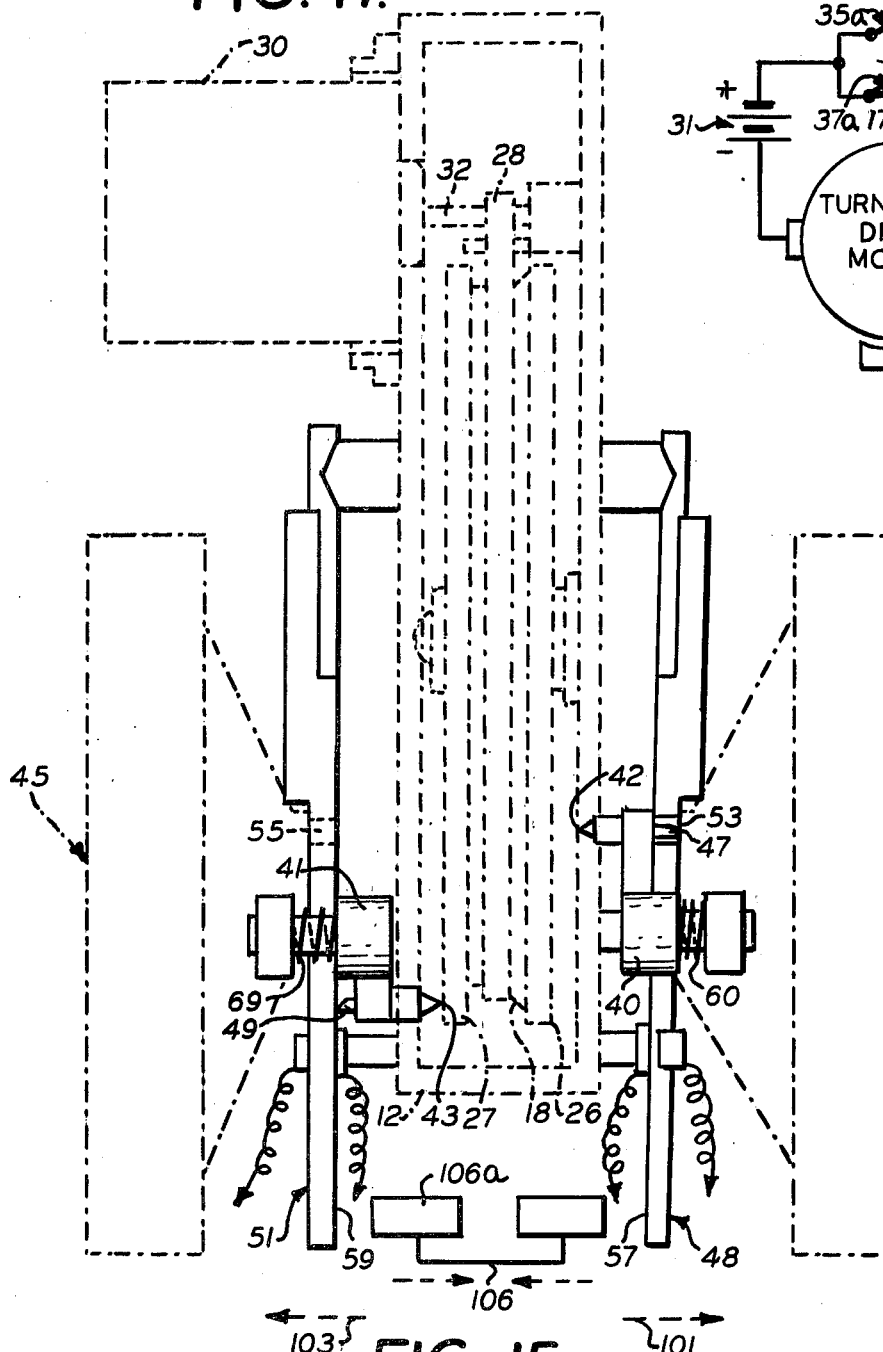
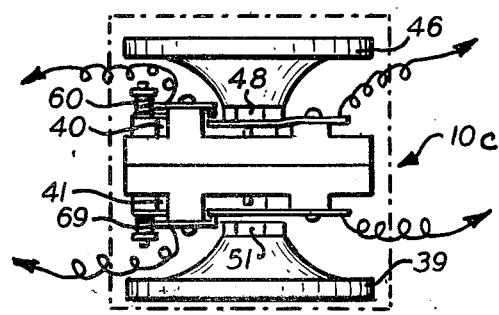

TOY PHONOGRAPH APPARATUS

CROSS-REFERENCE TO RELATED APPLICATIONS

This application is related to my previous U.S. Pat. No. 3,984,111, issued Oct. 5, 1976, entitled "Toy Phonograph"; my previous U.S. Pat. No. 4,055,351, issued Oct. 25, 1977, entitled "Resettable Toy Phonograph"; my copending U.S. Pat. application Ser. No. 825,940, filed Aug. 19, 1977, entitled "Toy Phonograph"; and my copending U.S. patent application Ser. No. 747,484, filed Dec. 6, 1976, entitled "Dual Record Toy Phonograph".

BACKGROUND OF THE INVENTION

1. Field of the Invention

The present invention relates to phonographs, and particularly to the types of phonographs known as toy phonographs.

2. Description of the Prior Art

Toy phonographs, that is phonographs such as for use as talking voice boxes, such as for talking dolls or for other types of so-called toys such as talking alarm clocks, are well known. An example of such prior art toy phonographs is disclosed in U.S. Pat. Nos. 3,589,735; 3,411,790; 3,538,638; 3,208,755; 3,055,664; 3,467,393; 3,823,946; 3,401,942; 3,208,755; 3,544,155; 3,784,210; 3,984,111; 4,055,351; Canadian Pat. No. 707,932; and British Patent No. 828,608, by way of example. In addition, a further example of such prior art toy phonographs is disclosed in U.S. Pat. Nos. 3,017,187 and 3,286,396. The entire field with respect to toy phonographs has been quite active with the primary motivation, because of their use in toys, being economics, efficiency and size so as to provide a practical, commercial embodiment for use in economically viable children's toys. Thus, the above patents, provided by way of example, merely disclose a quantitatively small amount of the large volume of different types of toy phonographs existent in the prior art with the difference between the various prior art toy phonographs in an attempt to provide toy phonographs which are economically viable being relatively narrow since apparently minor improvements can provide a significant improvement in efficiency and economics in the area of toy phonographs.

One of the primary concerns in providing economically viable toy phonographs relates to the current drain on the drive motors of these toy phonographs during operation since high current drain results in high battery drain, shorter life, and lower efficiency of the motor. For example, the arrangement disclosed in U.S. Pat. No. 3,467,393 employs a spring arrangement which acts upon the lift arm associated with the speaker cone such that the stylus pressure becomes greater as the stylus moves closer to the center of the turntable. This non-uniform pressure results in increased current drain on the motor and, the arrangement of the present invention, in which there is uniform pressure on the stylus or needle throughout its path of travel across the phonograph record, has been found to result in meaningfully less battery drain, longer life, and better efficiency of the drive motor, under the same operating conditions as the arrangement disclosed in U.S. Pat. No. 3,467,393. Other prior art arrangements have attempted to employ uniform pressure directly on the speaker cone as opposed to on the lift arm, such as disclosed in U.S. Pat. Nos. 3,208,755; 3,286,396 and 3,017,187. However, such direct pressure on the speaker cone itself has not been found to be satisfactory. Moreover, such arrangements have not been employed in what are commonly termed single play talking boxes, which are toy phonographs which shut off after one play of the record. In such an arrangement, it is critical that electrical contact be broken when the needle reaches the end of the record. Thus, control of the drive mechanisms of prior art toy phonographs employing leaf spring contact switches adjacent the end of the record, including that described in my copending U.S. patent applications Ser. Nos. 747,484 and 825,940, require that electrical contact be broken at the exact moment when the needle reaches the end of the record. Moreover, in the instance of the toy phonographs described in the above copending patent applications, it is imperative that the needle arm protrusion pop in the hole in the lift bar at the correct time since the needle arm should only engage one record at a time on the common turntable. This requirement, if not met, could cause the end of the record to be reached and not turn off or could cause premature turn off before the end of the record. Thus, it is imperative that positive shut off be facilitated in such a single play arrangement, particularly if the single play arrangement is to be used in a dual record toy phonograph as described in the aforementioned copending patent applications.

Such dual record toy phonographs, however, are also known in the prior art, such as disclosed in U.S. Pat. Nos. 2,506,925; 2,858,374; 3,538,638; 3,055,664 and 3,411,790. Further, these prior art devices, apart from what is disclosed in my aforementioned two copending patent applications, have either involved conventional automatic record changing mechanisms such as in expensive high fidelity equipment, such as disclosed in U.S. Pat. Nos. 2,506,925 and 2,858,374, or elaborate mechanical interconnections such as disclosed in U.S. Pat. No. 3,538,638, as opposed to the economic and efficient phonograph arrangements for enabling two separate phonograph records to be employed in the talking toy of the type disclosed in my two aforementioned copending patent applications.

These disadvantages of the prior art overcome by the present invention.

SUMMARY OF THE INVENTION

In a toy phonograph comprising a housing, the housing comprising a base, a turntable rotatably mounted on the base for rotation about an axis of rotation, a first pickup arm pivoted at one end and having a needle apparatus engageable with a playing surface of a first phonograph rotatably mounted on one side of the turntable, the phonograph record having a periphery, a first spring under whose force the first pickup arm is constantly placed for urging it toward the periphery of the first phonograph record and a first speaker cone arrangement resiliently mounted on the housing above the first pickup arm, the first speaker cone apparatus comprising a first lift bar apparatus removably engageable with the first pickup arm in sound reproducing contact, the improvement comprises an arrangement for resiliently pressing the first pickup arm needle apparatus into engagement with the first phonograph record for reproducing recorded sound from the first phonograph record playing surface during rotation of the turntable. The pickup arm needle circumscribes a path of travel across the first phonograph record playing surface from the periphery toward the center during the sound reproducing engagement with the aforementioned pressing arrangement comprising a second spring for substantially uniformly resiliently biasing the lift bar against the first pickup arm with a substantially uniform biasing force for exerting substantially uniform pressure on the needle throughout the entire path of travel circumscribed by the needle. This second spring preferably comprises a bifurcated spring member, such as a U-shaped spring member, resiliently pressing against the lift bar at a pair of spaced apart positions therealong. In addition, the pressing arrangement preferably comprises a third spring having an adjustable biasing force with the third spring resiliently biasing the second spring against the lift bar with the adjustable biasing force for adjustably varying the substantially uniform biasing force by varying the biasing force of the third spring. The bifurcated member is preferably connected to the housing at a single connection point located at its base. The improved toy phonograph may be either of the type used for a single play talking box or for a continuous play talking box or, if desired, for a dual record toy phonograph. When employed in a single play talking box, the aforementioned substantially uniform pressure on the lift bar Y bar prevents inadvertent bowing of this bar which could prevent proper shut off of the switch resulting from lift bar contact. Thus, the improved arrangement provided positive shut off in a single play box. Moreover, the improved arrangement of the present invention provides considerably less current drain on the drive motor as well as lessening battery drain, providing longer life and better efficiency for this drive motor than in arrangements in which a non-uniform pressure is applied to the stylus or pickup arm during play.

BRIEF DESCRIPTION OF DRAWINGS

FIG. 1 is a top plan view of the presently preferred embodiment of an improved resettable toy phonograph of the present invention with the cover removed;

FIG. 2 is a partially cut-away side elevation of the embodiment of the FIG. 1 with the cover shown in position in dotted lines;

FIG. 3 is a fragmentary exploded view, partially in section, of the turntable portion of the embodiment of FIG. 1;

FIG. 4 is a fragmentary view similar to FIG. 3 of the turntable portion of the embodiment of FIG. 1 assembled;

FIG. 5 is a fragmentary plan view of the pickup arm, lift bar and turntable portions of the embodiment of FIG. 1 diagrammatically illustrating their interrelationship;

FIG. 9 is a side elevation view similar to FIG. 7 with only the pickup arm and lift bar assemblies being shown in solid lines, illustrating one pickup arm at the end of the recording and the pickup arm at the opposite side at the beginning of the recording;

FIG. 10 is a schematic illustration of the turntable drive circuit of the embodiment of FIG. 6;

FIG. 11 is a block diagram of a talking toy bank employing a dual record toy phonograph of either FIG. 6 or FIG. 12;

FIG. 15 is a front elevation view from the right side thereof the embodiment of FIG. 13;

FIG. 16 is a schematic illustration similar to FIG. 10 of the turntable drive circuit of the embodiment of FIG. 12; and FIG. 17 is a side elevation similar to FIGS. 9 and 13 with only the pickup arm and lift bar assemblies being shown in solid lines, illustrating one pickup arm at the end of the recording and the pickup arm on the opposite side at the beginning of the recording for the embodiment of FIG. 12.

DETAILED DESCRIPTION OF PREFERRED EMBODIMENTS

Figure 6:
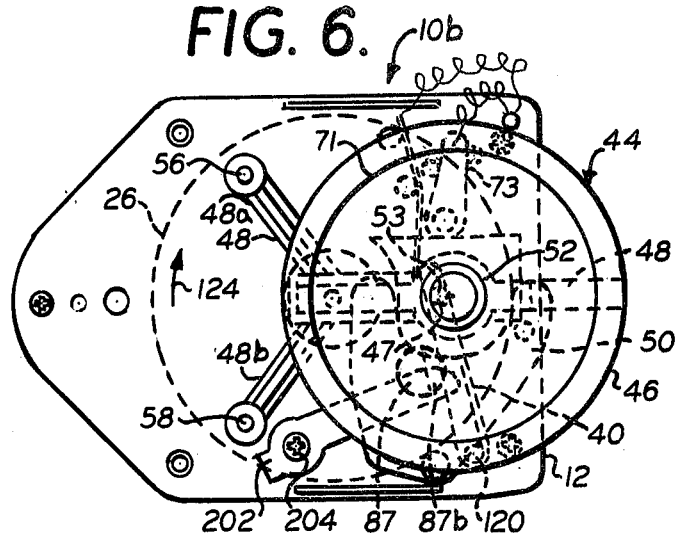
FIG. 6 is a top plan view, similar to FIG. 1, of an alternative embodiment of the improved toy phonograph of the present invention illustrating a dual record toy phonograph, with the cover removed.

Before describing the presently preferred embodiments for an improved toy phonograph, generally referred to by reference numerals 10a for FIGS. 1 through 5, 10b for FIGS. 6 through 11, and 10c for FIGS. 12 through 17, it should be noted that, as will be described in greater detail hereinafter, the improvement with respect to the arrangement for providing substantially uniform pressure on the Y-bar or lift bar arrangement, such as lift bar assemblies 48 and 51, by way of example, may preferably be employed in either a single play toy phonograph or talking box, such as the type illustrated in FIGS. 6 through 17, or a continuous play resettable toy phonograph, such as illustrated in FIGS. 1 through 5. Moreover, as will be described in greater detail hereinafter with respect to the single play embodiments of FIGS. 6 through 17, the improved toy phonograph of the present invention by providing substantially equal pressure on the Y-bar or lift bar assemblies 48 and 51 prevents inadvertent bowing in the lift bar assembly 48 or 51 which could prevent proper shut off the associated electrical switch which controls the supply of power to the drive motor for driving the associated turntable. Furthermore, the substantially uniform pressure provided by the presently preferred arrangement of the present invention, to be described in greater detail hereinafter, assists in minimizing current drain on the drive motor for the turntable as well as assisting in minimizing battery drain for DC powered toy phonographs, and increasing the efficiency of the drive motor.

Referring now to FIGS. 1 through 5, the continuous play improved toy phonograph embodiment 10a of the present invention shall now be described. As in previous conventional toy phonographs, such as the type described in U.S. Pat. No. 3,589,735, or as described in reference to my improved toy phonograph of the type described in U.S. Pat. No. 3,984,111, the phonograph comprises a housing 12 to which a cover 14, normally containing a speaker grill (not shown), is mounted conventionally such as by screws. The housing 12, as shown and preferred in FIG. 2, includes a base portion 16 which is preferably fixedly secured to the balance of the housing 12, such as by screws which are removable so as to allow access to the interior of the housing 12. A conventional turntable 18 is preferably rotatably mounted on the base 16 in housing 12 by means of a conventionally centrally located spindle or shaft 20 mounted to the base 16 (FIG. 3). The shaft 20 is located along the central axis 22 of the turntable 18. As shown and preferred in FIGS. 2 and 3, the configuration of the turntable 18 is such so as to form a groove 24 normal to the axis 22 of the shaft 20 in conjunction with a phonograph record 26 which is preferably removably mounted on the turntable 18 for rotation therewith. As also shown and preferred in FIG. 2, the groove 24 which preferably extends completely around the turntable 18, contains an endless belt, such as conventional rubberband 28, which is driven in conventional fashion by a DC motor 30 which receives power from a battery (not shown), with the motor 30 being conventionally turned on and off by means of a conventional on/off switch (not shown). The drive is accomplished in conventional fashion by a knurled shaft 32 which extends from the motor 30 into the interior of the housing 12, with the rubberband or belt 28 extending around the shaft 32 and around the turntable 18 in groove 24 so as to create a belt drive type of conventional arrangement which is well known for the drive of battery powered toy phongraphs. The phonograph record 26 is preferably a conventional plastic disc record such as the type conventionally utilized for talking voice boxes or toy phonographs, such as for use in dolls. As shown and preferred in FIG. 3, the phonograph record 26 which is preferably removable from the turntable 18 is preferably snap-fit onto the turntable 18 and is held in place by means of resilient plastic fingers 34, by way of example.

As also shown and preferred in FIGS. 1 and 2, the toy phonograph 10a of the present invention utilizes a conventional type of sound pickup mechanism for reproducing recorded sound from the phonograph record 26 playing surface. This conventional type of sound pickup mechanism, such as the type described in my previous U.S. Pat. No. 3,984,111 or in U.S. Pat. Nos. 3,589,735 or 3,054,664 or Canadian Pat. No. 707,932, preferably consists of a pickup arm 40 having a conventional phonograph needle 42 extending therefrom for contacting the playing surface of the phonograph record 26 and a speaker cone assembly 44 which when in direct contact with the pickup arm 40 as shown in FIG. 2, conventionally reproduces sound from the phonograph record playing surface 26 picked up by the needle 42, providing this sound in conventional fashion by vibration of the speaker cone 46 forming part of the speaker cone assembly 44. However, the pickup arm 40 of the present invention is different in configuration from the pickup arm described in my previous U.S. Pat. No. 3,984,111 in that the pickup arm 40 herein does not have a hook portion paralled to the playing surface of the record and, moreover, preferably contains an upstanding protrusion 47, preferably substantially normal to the phonograph record playing surface 26. It is this protrusion 47 which, as will be described in greater detail hereinafter, is preferably integrally formed with the balance of the pickup arm 40 assembly, which preferably maintains the direct contact with the speaker cone assembly 44 for conventionally reproducing sound from the phonograph record playing surface 26 picked up by the needle 42.

As also shown and preferred in FIGS. 1, 2 and 5, the speaker cone assembly 44 also preferably comprises the conventional type Y-shaped lift bar mechanism 48 for enabling the speaker cone 46 to be lifted out of and biased into engagement with the pickup arm 40 as is accomplished in conventional available toy phonographs although, the specific camming mechanism for accomplishing the engagement and disengagement of the speaker cone assembly 44 with the pickup arm 40 as well as the manual reset capability of lift bar mechanism 48 is not conventional, as will be described in greater detail hereinafter. As is shown and preferred in FIGS. 1, 2 and 5, the preferred lift bar mechanism 48 preferably includes an aperture 49 therein capable of removably receiving the upstanding protrusion 47 of the pickup arm 40 therein when the pickup arm 40 is pivotally moved into position and alignment with aperture 49 during the play of the phonograph record 16. The aperture 49 is preferably located above the phonograph record playing surface 26 adjacent the end of the phonograph record recording for enabling subsequent automatic reset of the pickup arm 40 to the periphery or beginning of the phonograph record 26 as will be described in greater detail hereinafter. In addition, as will be described in greater detail hereinafter, the preferred Y-shaped lift bar mechanism 48 preferably comprises an integral extension portion 51 which extends beyond housing 12 in order to enable manual reset of the pickup arm 40 to the periphery or beginning of the phonograph record playing surface 26 at any position of the pickup arm 40 along the phonograph record playing surface 26. Such extension portion 51 is not present in my previously described improved toy phonograph disclosed in U.S. Pat. No. 3,984,111.

As shown and preferred in FIGS. 1 and 2, the pickup arm 40 is preferably biased by a bifurcated leaf spring 50 bearing against the lift bar 48, with a substantially uniform biasing force at a pair of spaced apart positions along the lift bar 48 thereby exerting substantially equal pressure along the lift bar 48 and preventing inadvertent bowing thereof. As further shown and preferred in FIGS. 1 and 2, this bifurcated leaf spring 50 is preferably a U-shaped leaf spring which is preferably connected or mounted to the housing 12 at its base at only one point 201 of connection with the arms thereof pressing against the lift bar 48. In addition, as also shown and presently preferred in FIGS. 1 and 2, a second leaf spring 202 bears against bifurcated leaf spring 50 substantially at the center thereof. Leaf spring 202 exerts a biasing force against leaf spring 50 and its purpose is to readily vary the uniform biasing force exerted by leaf spring 202 by means of varying the biasing force of leaf spring 50 by loosening or tightening screw 204 which holds leaf spring 202 to housing 12. If desired, leaf spring 202 can be omitted and the biasing force of spring 50 varied directly, although this is presently less preferred for practical reasons.

Lift bar 48 is preferably fixedly secured to the speaker cone 46 at the center 52 thereof, and is biased into playing engagement with the phonograph record 26 playing surface as shown in FIG. 2 by spring 50 bearing against the lift bar 48. The lift bar mechanism 48 and, hence, the entire speaker cone assembly 44 which moves as a unit, is slidably mounted via extension arms 48a and 48b of the Y-shape forming the lift bar 48 on posts 56 and 58, respectively, for slidable movement up and down therealong. Springs 206 and 208 are preferably mounted on posts 56 and 58, respectively, at the end of the Y-bar 48 to compensate for any undesirable vibrations during use or shipment. A third point of contact or support of the lift bar 48 is made at point 52 which is in removable spring biased contact with the pickup arm 40 protrusion 47 as is shown and preferred in FIG. 2. As was previously mentioned, the spring 50 presses against the lift bar 48 with substantially uniform pressure and, thus, biases point 52 of the speaker cone assembly into direct contact with protrusion 47 on pickup arm 40 which then biases the needle 42 into playing engagement with the phonograph record playing surface 26 so as to exert a substantially uniform pressure on the needle 42 throughout its entire path of travel across the record 26 from the periphery thereof to its center. The pickup arm 40, via a conventional spring 60, is conventionally spring biased in a direct parallel to the playing surface of the phonograph record 26 toward the periphery thereof; however, the force of spring 50 is preferably sufficient to overcome the force of spring 60 so as to prevent the pickup arm 40, in conventional fashion, from moving toward th periphery of the phonograph record 26 during play while the speaker cone assembly 44 is in direct bearing contact with the protrusion 47 on pickup arm 40.

As shown and preferred in FIGS. 1 through 5, and particularly in FIG. 5, and as will be described in greater detail hereinafter, when the pickup arm 40 reaches the end of the phonograph record 26, that is the end of the recording, which is conventionally located adjacent the center of the record 26, protrusion 47 will seat in aperture 49 thereby removing the direct bearing contact of the speaker cone assembly 44 with the protrusion 47 on the pickup arm 40. At this point, a camming assembly will lift the speaker cone assembly 44 out of engagement with the pickup arm 40, such as by preferably raising the lift bar 48 a sufficient amount to lift aperture 49 above protrusion 47 on pickup arm 40, thereby unseating the protrusion 47 from aperture 49, so as to enable automatic reset of the pickup arm 40 to the periphery of the phonograph record 26 under the action of spring 60 and, subsequently, when this has been accomplished, return the speaker cone assembly 44 into direct bearing contact engagement with protrusion 47 of pickup arm 40 to enable replay of the recording. The camming assembly preferably comprises a downwardly extending protrusion 61 located at the bottom of the lift bar mechanism 48 and preferably integrally formed therewith, with the downwardly extending protrusion 61 also preferably being adjacent the end of the recording. In addition, the cam assembly also preferably comprises a floating cam 70, to be described in greater detail hereinafter, and a second cam 72 which is axially mounted on the turntable 18 axis of rotation and fixedly rotatable with the turntable 18. Cams 70 and 72 preferably comprise a pair of spaced apart cam surfaces 70a and 70b for cam 70 and 72a and 72b for cam 72 which are preferably located 180° apart about the periphery of cams 70 amd 72, respectively, and are each respectively mirror images of each other as indicated by the dotted lines in FIGS. 3 and 4. As shown and preferred in FIGS. 3 and 4, cams 70 and 72 are nestable with each other for rotation therewith when in nested engagement. Moreover, the periphery of both cams 70 and 72 are preferably substantially circular in configuration, however, preferably, having the aforementioned intermittent mirror image mateable camming surfaces 70a and 70b for cam 70 and 72a and 72b for cam 72 spaced approximately 180° apart about this circular periphery, with these camming surfaces 70a, 70b, 72a and 72b preferably being arcuately sloped and with cam surfaces 70a and 70b being referred to as upper peripheral cam surfaces and cam surfaces 72a and 72b being referred to as lower peripheral cam surfaces, and with upper peripheral cam surface 70a being substantially congruent to lower peripheral cam surface 72a with upper peripheral cam surface 70b correspondingly being substantially congruent to lower peripheral cam surface 72b. Thus, these intermittent cam surfaces 70a–70b and 72a–72b are preferably provided herein as opposed to the continuous triangularly sloped cam surfaces described in my previous U.S. Pat. No. 3,984,111. Floating cam 70 is preferably biased into nesting engagement with cam 72 by means of a spring 80 held in place by a screw 81 which is threadably mounted to shaft 20 as illustrated in FIG. 3, with shaft 20 preferably extending through the interior of floating cam 70 and through the center of cam 72 and the turntable 18 and, which by virtue of screw 81 in conjunction with cap 83, threadably secures the cam assembly 70–72 to the turntable 18 and subsequently to the base portion 16 for enabling rotatable drive of the turntable 18 about the shaft 20 with the entire arrangement being held in position about the central axis 22 for rotation thereabout. As shown and preferred in FIG. 4, this spring 80 biases the cams 70 and 72 into nesting engagement by applying a spring force in the direction of arrow 84.

As further shown and preferred in FIGS. 1 through 5, the floating cam 70 preferably includes an outwardly extending protrusion 86 which preferably extends outwardly parallel to the playing surface of the phonograph record 26 with the protrusion 86 preferably being unitary with the floating cam 70 so as to be rotatable therewith. Preferably, protrusion 86 is located beneath protrusion 61 and is out of engagement therewith when the lift bar mechanism 48 is in direct bearing contact with protrusion 47 on the pickup arm 40. However, as will be described in greater detail hereinafter, when the pickup arm 40 has pivotally moved so as to enable protrusion 47 to seat in lift bar aperture 49, the direct bearing contact of lift bar 48 against protrusion 47 is removed and spring 50 biases lift bar 48 downwardly in the direction of arrow 85 which, because of the height of protrusion 47 above the planar top surface of the balance of the pickup arm 40, enables the lift bar 48 to drop a sufficient amount in the direction of the phonograph record playing surface 26 to enable protrusions 61 and 86 to become engageable for halting rotation of the floating cam 70, as will be described in greater detail hereinafter, which thus occurs when pickup arm 40 is adjacent the end of the phonograph record recording. Such engagement of protrusions 61 and 86 is illustrated in FIG. 5.

In addition, as shown and preferred in FIG. 2, an additional upstanding member 87 is provided adjacent the end of the phonograph record recording which extends from housing 12 above the phonograph record playing surface 26 and is preferably located between the lower surface of the lift bar mechanism 48 and the phonograph record playing surface 26. Member 87 preferably comprises a portion 87a which extends substantially normal to the playing surface and acts as a stop member for the pickup arm 40 when it reaches the end of the recording, and an overhang portion 87b which extends substantially parallel to the playing surface of phonograph record 26. Overhang portion 87b is referably located at a sufficient height so as to enable the top surface of the pickup arm 40 from which protrusion 47 extends to be seated therebeneath when protrusion 47 is seated in aperture 49. Preferably, the height of overhang 87b is sufficient to enable some space to exist sufficient to enable movement of the pickup arm 40 pivotally into and out of engagement against stop member 87a while restraining upward movement opposite the direction of arrow 85 of the pickup arm 40. The primary purpose of overhang 87b is to prevent the pickup arm 40 from lifting up with the speaker cone assembly 44 when the speaker cone assembly 44 is raised due to cams 70 and 72 being driven out of nesting engagement with each other. However, as previously mentioned, the height of the overhang portion 87b is sufficient to enable the pickup arm 40 to be resiliently returned to the periphery of the record 26 by the action of spring 60 when the camming assembly 70-72 being driven out of nesting engagement raises the lift arm 48 a sufficient amount to raise aperture 49 above protrusion 47.

Referring now to FIGS. 1, 2, 4 and 5, the operation of the camming assembly 70-72 in conjunction with the lift bar mechanism 48 and protrusion 47 on pickup arm 40 to lift the speaker cone assembly 44 out of engagement with the pickup arm 40 to enable automatic reset of the pickup arm 40 to the periphery of the record 26 shall now be described. The pickup arm 40, is conventionally pivotally mounted, such as at pivot point 90, on the housing 12. As was previously described, the pickup arm 40 is biased in conventional fashion into playing engagement with the phonograph record 26 playing surface via the speaker cone assembly 44 with which it is in direct bearing engagement due to lift bar mechanism 48 bearing against protrusion 47 to enable reproduction of the recorded sound. The pickup arm 40 conventionally moves along the record groove towards the center of the record 26, as indicated by arrow 96, to reproduce the sound recorded on the record 26 as the turntable 18, and hence, the phonograph record 26, rotate due to the belt drive 28. During this time, cam surfaces 70a-70b and 72a-72b of cams 70 and 72, respectively, are in nesting engagement and thus, simultaneously rotate together. During such simultaneous rotation, the protrusion 86 is situated so as to be rotatable beneath the lift bar 48 as well as beneath protrusion 61 extending downwardly from lift bar 48 so as to be out of contact with the speaker cone assembly 44. As the pickup arm 40 nears the end or center of the phonograph record 26, protrusion 47 aligns with aperture 49 in lift bar 48 and seats therein. This removes the direct bearing engagement of lift bar mechanism 48 against protrusion 47 and spring 50 (acted upon by spring 202 if employed) resiliently urges lift bar mechanism 48 in the direction of arrow 85 downwardly until the lift bar mechanism rests against the top surface of the pickup arm 40 from which protrustion 47 extends. This lowers the pickup arm 40 a sufficient amount to enable protrusion 61 to be placed in the path of rotating protrusion 86 so that these protrosions can be placed in engagement with each other and, accordingly, as protrusion 86 rotates it subsequently bears against protrusion 61 to halt the rotation of protrusion 86, with the phonograph record 26 continuing to be driven by motor 30 for rotation in a direction of arrow 98. This engagement of protrusions 61 and 86 prevents the floating cam 70 from further rotation. However, the bottom cam 72 which is fixedly rotatable with the turntable 18 continues to rotate due to the drove of motor 30. This continued rotation of the bottom cam 72 while the floating cam 70 is now held stopped against rotation causes the floating cam 70 cam surfaces 70a and 70b to ride up the sloped surfaces 72a and 72b, respectively, of bottom cam 72, overcoming the spring force of spring 80, to the top of the arcuate cam surfaces 72a and 72b. The height or total rise of the arcuate sloped surfaces 72a and 72b is sufficient to enable contact of the top surface 100 of the floating cam 70 with the lift bar 48 and to lift it a sufficient amount in the direction of arrow 101 to lift aperture 49 above the top of protrusion 47 and enable the spring loaded pickup arm or needle arm 40 to no longer be in contact with the speaker cone assembly 44 and thus enable the spring loaded needle or pickup arm 40 to reset to its starting position at the periphery of the phonograph record 26 under the action of spring 60. The extent and location of the cam surfaces is preferably sufficient to enable the pickup arm 40 to completely return to the starting position at the peripery of the phonograph record 26. When this is accomplished, as the bottom cam 72 continues to rotate, the floating cam 70 returns to nesting engagement with cam 72 by dropping back into the groove defining cam surfaces 72a and 72b, respectively, thus removing the force in the direction of arrow 101 and reestablishing direct bearing contact between the speaker cone assembly 44 and protrusion 47 on pickup arm 40 due to spring 50 again pressing the speaker cone assembly 44 and the pickup arm 40 into playing engagement with the phonograph record 26 playing surface.

As further shown and preferred in FIGS. 1, 2 and 5, and as peviously mentioned, lift bar mechanism 48 also preferably includes an integral extension portion 51 for enabling manual reset of the pickup arm 40 to the periphery of the record 26 at any time during the play thereof, such as before the pickup arm 40 reaches the end of the record so as to enable the aforementioned automatic reset operation to occur in conjunction with the seating of protrusion 47 in aperture 49. This extension 51 enables a force to be applied in the direction of arrow 101 at the end of extension portion 51 to lift the pickup arm 40 out of bearing engagement with protrusion 47, thereby enabling spring 60 to resiliently return pickup arm 40 to the beginning or periphery of the record 26. This may preferably be accomplished in conjuction with the turning on and off of the drive motor 30 by means of a conventional mechanical interconnection 103 between the conventional on/off switch 105 for the power supply for motor 30 on which switch mechanical interconnection 103, by way of example, would raise lift bar 48 in the direction of arrow 101 when the switch is moved to the off position, thereby insuring that the record will always start at the beginning thereof when the phonograph 10 is turned on.

Referring now to FIGS. 6 through 11, the presently preferred improved toy phonograph shall now be described with respect to a dual record toy phonograph single play embodiment 106. Like functioning components to that of the previously described embodiment 10a will have the same reference numerals for purposes of clarity. As in previous conventional toy phonographs, such as described in U.S. Pat. No. 3,589,735, or as described with reference to my improved toy phonographs of the type described in my previous U.S. Pat. No. 3,984,111, or above with respect to FIGS. 1-5, the phonograph comprises a housing 12 to which a cover 14 normally containing a speaker grill (not shown), is mounted conventionally, such as by screws. However, as will be described in greater detail hereinafter, unlike previous conventional toy phonographs, the dual record toy phonograph 10b shown in FIGS. 6–11 preferably comprises two speaker grills, one on each side of the housing with a common turntable 18 having two phonograph records 26 and 27 rotatably mounted on opposite sides thereof. The housing 12 as shown and preferred in FIG. 7, preferably comprises a symmetrical housing including an upper base portion 16 and a lower base portion 17, either of which or both, may be preferably fixedly secured to the balance of the housing 12 such as by screws which are removable so as to allow access to the interior of the housing 12.

The aforementioned turntable 18 is preferably a conventional type of turntable except for its ability to rotatably retain phonograph records 26 and 27 on opposite sides thereof. Turntable 18 is preferably rotatably mounted on base portion 16, by way of example, between base portions 16 and 17, in housing 12 by means of the conventional centrally located spindle or shaft 20 illustratively shown as being mounted to base portion 16. The shaft 20 is preferably located along the central axis 22 of the turntable 18. As shown and preferred in FIGS. 7 and 9 and as previously described the configuration of the configuration of the turntable 18 is such so as to form groove 24 normal to the axis 22 of the shaft 20 in conjunction with phonograph records 26 and 27 which are preferably removably mounted on opposite sides of the turntable 18 for simultaneous rotation therewith. As also shown and preferred in FIGS. 7 and 9, the groove 24 which preferably extends completely around the turntable 18, contains an endless belt, such as conventional rubberband 28, which is driven in conventional fashion by the conventional DC motor 30 which receives power from a DC source such as a battery 31 (FIG. 10), with the motor 30 being conventionally turned on and off by means of a conventional on/off switch 33 in conjunction with parallel switches 35 and 37, which will be described in greater detail hereinafter in conjunction with the description of the automatic shut off feature of the embodiment of FIGS. 6–11. The turntable 18 drive is accomplished in conventional fashion by knurled shaft 32 which extends from the motor 30 into the interior of the housing 12, with the rubberband or belt 28 extending around the shaft 32 and around the turntable 18 in groove 24 so as to create the previously described belt drive type of conventional arrangement which is well known for the drive of battery powered toy phonographs.

Each of the phonograph records 26, 27 is preferably a conventional type of plastic disc record such as the type conventionally utilized for talking voice boxes or toy phonographs, such as for use in dolls. However, one of the phonograph records, for example phonograph record 26, is conventionally recorded with a conventional clockwise sound reproducing groove containing the messagge to be reproduced from the phonograph record 26, while the other phonograph record 27 is preferably recorded with a counterclockwise sound reproducing groove for reproducing the recorded message from phonograph record 27. The manner of actually recording the message in the counterclockwise sound reproducing groove of phonograph record 27 is conventional with the exception that, whereas conventional recordings are accomplished in the clockwise direction, the recording on phonograph record 27 is preferably accomplished in the counterclockwise direction determined by rotation of phonograph record 27 in the direction opposite to the normal direction of rotation during the initial recording thereof. In this manner, when common turntable 18 rotates in conventional clockwise fashion about turntable axis 22, the recording contained on phonograph record 26 will be reproducible from a clockwise sound reproducing groove, whereas the recording contained on phonograph record 27 will be reproduced from a counterclockwise sound reproducing groove, the reproducing of the recorded message otherwise being identical. As also shown and preferred in FIG. 7, phonograph record 26 is preferably removably mountable on one side of turntable 18 by a snap-fit, being held in place by means of conventional resilient plastic fingers 34, by way of example, and phonograph record 27 is preferably removably mountable on the opposite side of turntable 18 by a similar snap-fit onto turntable 18, being held in place by means of identical resilient plastic fingers 135, by way of example. The recordings contained in phonograph records 26 and 27 are preferably different in content, although they could be identical in content if desired.

Figure 7:
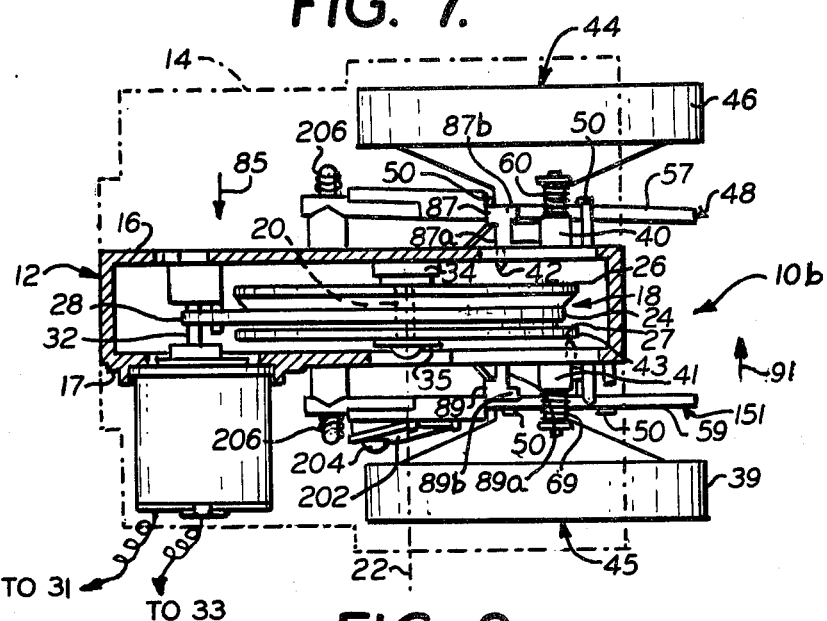
FIG. 7 is a partially cut-away side elevation of the embodiment of FIG. 6 with the cover shown in position in dotted lines.
Figure 8:
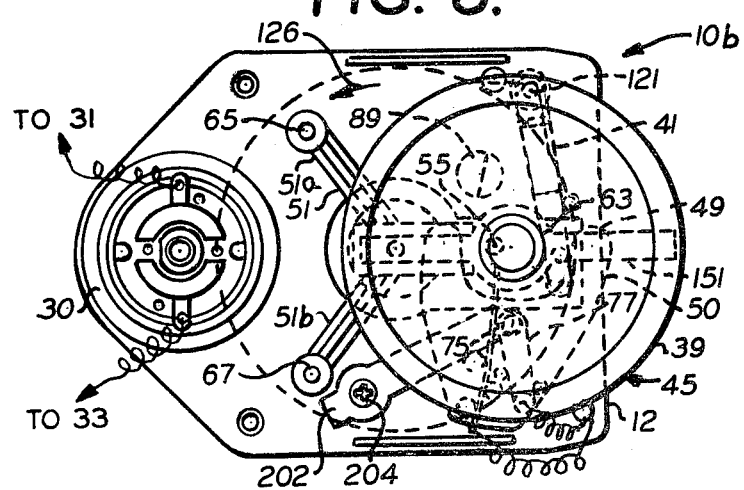
FIG. 8 is a bottom plan view of the embodiment of the dual record toy phonograph shown in FIG. 6 with the cover removed, FIGS. 6 and 8 being top plan and bottom plan views, respectively, with respect to FIG. 7.
Figure 12:
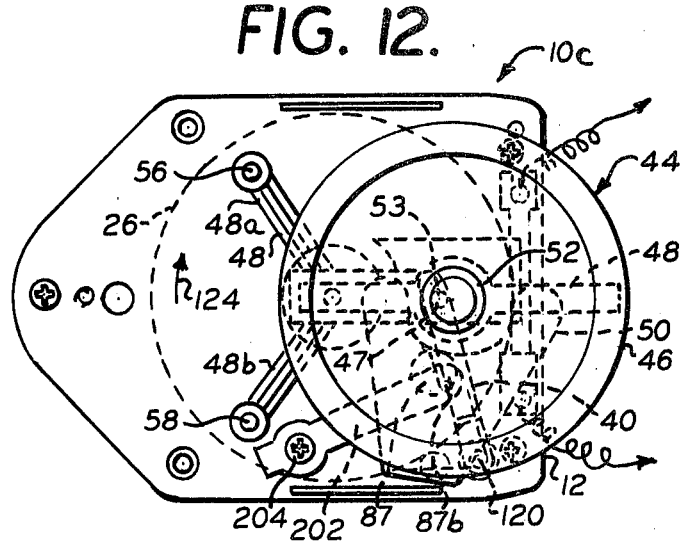
FIG. 12 is a top plan view of another embodiment of the dual record toy phonograph of FIGS. 6 through 10.

As also shown and preferred in FIGS. 6 through 9, the toy phonograph 10b of the embodiment of FIGS. 6–11 utilizes a conventional type of sound pickup mechanism for reproducing recorded sound from the phonograph record 26 playing surface and from the phonograph record 27 playing surface. This conventional type of sound pickup mechanism, such as the type previously described above, preferably consists of pickup arm 40–41 having a conventional phonograph needle 42–43 extending therefrom for contacting the playing surface of the respective phonograph record 26–27, and an associated speaker cone assembly 44 and 45, respectively. Pickup arm 40, needle 42, and speaker cone assembly 44 are associated with phonograph record 26 and pickup arm 41, needle 43 and speaker cone assembly 45 are associated with phonograph record 27. When the speaker cone assembly 44 or 45 is in direct contact with its associated pickup arm 40 or 41, respectively, such as illustrated in FIGS. 7 and 9 which illustrate the direct contact between speaker cone assembly 45 and pickup arm 41, sound is conventionally reproduced from the phonograph record playing surface 27, by way of example, picked up by the needle 43, by providing this sound in conventional fashion by vibration of the speaker cone 39 forming part of the speaker cone assembly 45. Similarly, when speaker cone assembly 44 is in direct contact with pickup arm 40, sound is conventionally reproduced from the phonograph record playing surface 26 picked up by the needle 42, by providing this sound in conventional fashion by vibration of the speaker cone 46 forming part of the speaker cone assembly 44.

In addition to the unique provision of two separate pickup arms 40 and 41 and two separate speaker cone assemblies 44 and 45 in conjunction with two separate phonograph records 26 and 27 being simultaneously rotated by a common turntable 18, the pickup arms 40 and 41 of the embodiment of FIGS. 6–11 are different in configuration from the pickup arms described in my previous U.S. Pat. No. 3,984,111. However, these pickup arms 40 and 41 are preferably identical with the pickup arm described in my copending U.S. patent application entitled "Improved Resettable Toy Phonograph", filed Dec. 6, 1976, bearing U.S. No. 747,485, by way of example. Thus, pickup arms 40 and 41 do not have hook portions parallel to the playing surface of the respective associated phonographs records 26 and 27 but, preferably contain upstanding protrusions 47 and 49, respectively, preferably substantially normal to the associated phonograph record playing surfaces 26 and 27, respectively. It is these protrusions 47 and 49 which, as previously described with respect to the embodiment 10a of FIGS. 1–5, are preferably integrally formed with the balance of the pickup arm assemblies 40 and 41, respectively, which preferably maintain the direct contact with the associated speaker cone assembly 44 and 45, respectively, for conventionally reproducing sound from the phonograph record playing surfaces 26 and 27, respectively, picked up by the needles 42 and 43, respectively.

As also shown and preferred in FIGS. 6 and 9, each of the speaker cone assemblies 44 and 45 also preferably comprises the aforementioned associated conventional type Y-shaped lift bar mechanisms 48 and 151, respectively, for enabling the associated speaker cone 46 and 39, respectively, to be lifted out of and biased into engagement with the respective pickup arm 40 and 41, respectively, as is accomplished in conventional available toy phonographs. However, unlike my previous U.S. Pat. No. 3,984,111 or the aforementioned embodiment 10a, there is no specific camming mechanism for accomplishing the engagement and disengagement of the speaker cone assemblies 44 and 45 with the respective pickup arms 40 and 41, such disengagement rather being accomplished by a mechanically operable reset capability of the associated lift bar mechanisms 48 and 151 which is not conventional. Moreover, as will be described in greater detail hereinafter, the toy phonograph 10b of the embodiment of FIGS. 6–11 is preferably designed so as to provide only a single play of the recording from the phonograph record 26 or 27 unless the associated pickup arm 40 or 41 is again reset, such as results from the mechanical lifting of the associated lift bar assembly 48 or 151, as will be described in greater detail hereinafter, such as when the toy phonograph 10b comprises part of a talking toy bank. As is further shown and preferred in FIGS. 6 through 9, each of the preferred lift bar mechanisms 48 and 151 preferably includes an associated aperture 53 and 55, respectively, therein, capable of removably receiving the respective upstanding protrusion 47 or 49 of the associated pickup arm 40 or 41, respectively, therein when the associated pickup arm 40 or 41 is pivotally moved into position and alignment with aperture 53 or 55, respectively, during the play of the phonograph record 26 or 27, respectively. Aperture 53 is preferably located above the phonograph record playing surface 26 adjacent the end of the phonograph record 26 recording for enabling automatic shut off of reproduction of the phonograph record 26 recording at the end of the record 26, as will be described in greater detail hereinafter, and aperture 55 is preferably located above the phonograph record playing surface 27 adjacent the end of the phonograph record 27 recording for enabling automatic shut off of reproduction of the phonograph record 27 recording at the end of the record 27, whereby a single play of the message recorded on the respective phonograph record playing surfaces 26 and 27 is provided, as will be described in greater detail hereinafter. Subsequent automatic reset of the associated pickup arm 40 or 41 to the periphery or beginning of the respective phonograph records 26 and 27, is accomplished by mechanical lifting of the associated lift bar assemblies 48 and 151, respectively, as will be described in greater detail hereinafter, which raises the associated lift bar apertures 53 and 55, respectively, above the height of the protrusion 47 and 49, respectively, seated therein to enable automatic reset of the pickup arm 40 or 41, respectively, to the periphery or beginning of the associated phonograph record 26 or 27 as will be described in greater detail hereinafter. In order to accomplish this mechanical reset, as will also be described in greater detail hereinafter, each of the preferred Y-shaped lift bar mechanisms 48 and 151 preferably comprises an integral extension portion 57 and 59, respectively, which extends beyond housing 12 in order to enable mechanical lifting of the associated lift bar mechanisms 48 and 151 and subsequent reset of the respective pickup arms 40 and 41 to the periphery or beginning of the associated phonograph record playing surfaces 26 and 27 whenever such mechanical lifting occurs to either raise the associated lift bar aperture 53 or 55 a sufficient amount to unseat the associated protrusion 47 or 49 of the pickup arm 40 or 41, respectively, or to remove the direct bearing contact between the lift bar assembly 48 or 151, respectively, and the associated pickup arm protrusion 47 or 49 at any position of the respective pickup arms 40 and 41 along the respective phonograph record playing surfaces 26 and 27. Such extension portions 57 and 59 are similar to previously described extension portion 51. As shown and preferred in FIGS. 6 through 8, each of the pickup arms 40 and 41 are preferably spring biased into playing engagement with the associated phonograph record playing surface 26 or 27, respectively, such as by the aforementioned leaf spring arrangement 50–202 being located on each side of the phonograph for respectively bearing against the associated lift bar 48 or 151, with a substantially uniform pressure for providing such uniform pressure to the respective pickup arms 40 and 41 throughout the path of travel of the associated needles 42–43 across the respective phonograph record playing surfaces 26–27. Lift bars 48 and 151 are preferably fixedly secured to the associated speaker cone 46 and 39, respectively, at the respective center 52 or 63 thereof, as shown and preferred in FIGS. 7 and 8. Each of the lift bar mechanisms 48 and 151 and, hence, the entire associated speaker cone assemblies 44 and 45 which each separately move as a unit, are slidably mounted via extension arms 48a and 48b of the Y-shape forming the lift bar 48 on posts 56 and 58, respectively, and via extension arms 51a and 51b of the Y-shape forming the lift bar 151 on posts 65 and 67, respectively, for slidable movement up and down therealong. A third point of contact or support of the lift bar 48 is made at point 52 which is in removable spring biased contact with the pickup arm 40 protrusion 47 and a third point of contact or support of the lift bar 151 is made at point 63 which is in removable spring biased contact with the pickup arm 41 protrusion 49, as is shown and preferred in FIGS. 7 and 9. As was previously mentioned, the spring 50 resiliently presses against the lift bar 48 and, thus, biases point 52 of the speaker cone assembly 44 into direct contact with protrusion 47 on pickup arm 40 which then biases the needle 42 into playing engagement with the phonograph record playing surface 26, and the corresponding spring 50 on the other side resiliently presses against the lift bar 151 and, thus, biases point 63 of the speaker cone assembly 45 into direct contact with protrusion 49 on pickup arm 41 which then biases the needle 43 into playing engagement with the phonograph record playing surface 27.

Pickup arm 40, via the conventional spring 60, is preferably conventionally spring biased in a direction parallel to the playing surface of the phonograph record 26 toward the periphery thereof; however, the force of spring 50 is preferably sufficient to overcome the force of spring 60 so as to prevent the pickup arm 40, in conventional fashion, from moving towards the periphery of the phonograph record 26 during play while the speaker cone assembly 44 is in direct bearing contact with the protrusion 47 on pickup arm 40. Similarly, pickup arm 41 via a conventional spring 69, is preferably conventionally spring biased in a direction parallel to the playing surface of the phonograph record 27 toward the periphery thereof; however, the force of spring 50 is preferably sufficient to overcome the force of spring 69 so as to prevent the pickup arm 41, in conventional fashion, from moving toward the periphery of the phonograph record 27 during play while the speaker cone assembly 45 is in direct bearing contact with the protrusion 49 on pickup arm 41.

As is shown and preferred in FIGS. 6 through 9, and particularly in FIGS. 6, 7 and 9, and as will be described in greater detail hereinafter, when the pickup using pickup arm 40 by way of example in FIG. 9, the operation being identical for pickup arm 41 and record 27, reaches the end of the phonograph record 26, that is the end of the recording, which is conventionally located adjacent the center of the record 26, the pickup arm protrusion 47 will seat in the lift bar aperture 53 thereby removing the direct bearing contact of the speaker cone assembly 44 with the protrusion 47 on the pickup arm 40. In addition, as is shown by reference to FIGS. 6 and 10, a conventional electrical leaf spring contact arrangement 71-73, which comprises switch 35, by way of example, and which is normally biased to the closed circuit condition, is then forceably held in the open circuit condition due to pickup arm 40 bearing against leaf spring contact 71 removing it from electrical contact against contact 73 and is held in this position as long as the pickup arm protrusion 47 is seated in the lift bar aperture 53. As is shown by reference to FIG. 10 a similar leaf spring electrical contact arrangement 75-77, which comprises switch 37 by way of example, is provided on the opposite side with respect to pickup arm 41 and phonograph record 27, with this leaf spring switch arrangement 75-77 being shown in the closed circuit condition in FIGS. 8 and 10. In this closed circuit condition, as long as on/off switch 33 is closed, power will be supplied from power source 31, to the turntable drive motor 30, to effect rotatable drive of turntable 18 and, correspondingly, simultaneous rotation of phonograph records 26 and 27. However, as long as the pickup arm protrusion 47 is seated in the lift bar aperture 53, the needle 42 is not in contact with the phonograph record playing surface 26 and sound cannot thereby be reproduced from the phonograph record 26 although, since as illustratively shown by way of example in FIG. 9, the needle 43 associated with pickup arm 41 is in contact with the phonograph record playing surface 27 due to direct bearing contact between lift bar 151 and the protrusion 49 on the pickup arm 41, sound will be reproduced from the phonograph record playing surface 27 from the counterclockwise groove recorded therein. Of course, if on/off switch 33 is manually moved to the open circuit condition, phonograph 10b will not operate irrespective of the open or closed circuit condition of switches 35 and 37 defined by contacts 71-73 and 75-77, respectively. Moreover, if on/off switch 33 is in the closed circuit condition, and both switches 35 and 37 are in the open circuit condition, the toy phonograph 10b of the embodiment of FIGS. 6-11 will not operate to produce sound since the turntable drive motor 30 will not be turned on. This latter condition preferably occurs when both pickup arms 40 and 41 have their respective protrusions 47 and 49 seated in lift bar apertures 53 and 55, respectively, with both of the pickup arms 40 and 41 located at the ends of the respective recordings associated with phonograph records 26 and 27, respectively. As will be described in greater detail hereinafter, this is the preferred off condition for the phonograph 10b, such as when the phonograph 10b forms part of a talking toy bank as will be described in greater detail hereinafter. Thus, in such a condition, when pickup arm 41, shown at the beginning of the record of periphery of phonograph record 27 in FIGS. 7 and 9, reaches the end of the phonograph record 27, that is the end of the recording, which is conventionally located adjacent the center of the record 27, the protrusion 49 will seat in lift bar aperture 55 thereby removing the direct bearing contact of the speaker cone assembly 45 with the protrusion 49 on the pickup arm 41 and opening switch 37 by separating electrical contacts 75 and 77 due to pickup arm 41 bearing against leaf spring 75 to bias it to the open circuit condition. It should be noted that preferably leaf springs 71 and 75 are normally biased to the closed circuit condition by being normally biased in a direction placing them into contact with electrical contacts 73 and 77, respectively.

As shown and preferred in FIG. 7, an additional upstanding member 87 is provided adjacent the end of the phonograph record 26 recording which extends from housing 12 above the phonograph record playing surface 26 and is preferably located between the lower surface of the lift bar mechanism 48 and the phonograph record playing surface 26, and a separate additional upstanding member 89 is provided adjacent the end of the phonograph record 27 recording which extends from housing 12 above the phonograph record playing surface 27 and is preferably located between the lower surface of the lift bar mechanism 151 and the phonograph record playing surface 27. Members 87 and 89 each preferably comprise portions 87a and 89a, respectively, which extend substantially normal to the playing surface and act as a stop member for the pickup arm 40 and 41, respectively, when the pickup arm reaches the end of the recording, and overhang portions 87b and 89b, respectively, which extend substantially parallel to the playing surface of phonograph records 26 and 27, respectively. Overhang portion 87b is preferably located at a sufficient height so as to enable the top surface of the pickup arm 40 from which the protrusion 47 extends to be seated therebeneath when the protrusion 47 is seated in lift bar aperture 53, as illustrated in FIG. 9. Similarly, overhang portion 89b is preferably located at a sufficient height so as to enable the top surface of the pickup arm 41 from which the protrusion 49 extends to be seated therebeneath when the protrusion 49 is seated in the lift bar aperture 55. Preferably, the height of overhang 87b is sufficient to enable some space to exist sufficient to enable movement of the pickup arm 40 pivotally into and out of engagement against stop member 87a while restraining upward movement of the pickup arm 40 in a direction opposite to the direction of arrow 85, and the height of overhang 89b is sufficient to enable some space to exist sufficient to enable movement of the pickup arm 41 pivotally into and out of engagement against stop member 89a while restraining upward movement of the pickup arm 41 in a direction opposite to the direction of arrow 91. The primary purpose of overhangs 87b and 89b, respectively, is to prevent the respective pickup arms 40 and 41 from lifting up with the speaker cone assemblies 44 and 45, respectively, when the speaker cone assemblies 44 and 45 are each respectively, mechanically lifted in a direction opposite to the direction of arrows 85 and 91, respectively. As previously mentioned, however, the height of the overhang portion 87b and 89b is sufficient to enable the respective pickup arms 40 and 41 to be resiliently returned to the periphery of the respective records 26 and 27 by the action of springs 60 and 69, respectively, when the respective lift bars 48 and 151 are mechanically raised a sufficient amount to raise the respective lift bar apertures 53 and 55 above the respective protrusions 47 and 49.

As further shown and preferred in FIGS. 6 through 9, and as previously mentioned, lift bar mechanism 48 also preferably includes an integral extension portion 57 for enabling mechanical reset of the pickup arm 40 to the periphery of the record 26 either to initiate reproduction of the message recorded in the clockwise groove on phonograph record 26 or at any time during the play thereof, such as before the pickup arm 40 reaches the end of the record, and lift bar mechanism 151 preferably includes an integral extension portion 59 for enabling mechanical reset of the pickup arm 41 to the periphery of the record 27 either to initiate reproduction of the message recorded in the counterclockwise groove on phonograph record 27 or at any time during the play thereof, such as before the pickup arm 41 reaches the end of the record. Extension 57 enables a force to be applied in the direction of arrow 101 at the end of extension portion 57 to lift the lift arm 48 out of bearing engagement with protrusion 47, thereby enabling spring 60 to resiliently return pickup arm 40 to the beginning or periphery of the record 26. Such resilient return also enables switch 35 to close due to leaf spring 71 being normally biased to the closed circuit condition, which normal bias force is no longer overcome by the bearing relationship of pickup arm 40 against leaf spring 71. Thus, if on/off switch 33 is closed, the closing of switch 35 will complete the circuit from power source 31 to turntable drive motor 30, thereby turning on motor 30 and rotatably driving turntable 18 and enabling reproduction of the recorded message from phonograph record playing surface 26 due to subsequent direct bearing contact of lift bar 48 against the protrusion 47 when the pickup arm 40 reaches the periphery of the phonograph record 26. Similarly, extension 59 enables a mechanical force to be applied in the direction of arrow 103 at the end of extension portion 59 to lift the lift arm 151 out of bearing engagement with protrusion 49, thereby enabling spring 69 to resiliently return pickup arm 41 to the beginning or periphery of the record 27, as illustrated in FIG. 9. Similarly, since pickup arm 41 does not then bear against leaf spring contact 75, switch 37 will close due to the failure to then overcome the normal biasing force of leaf spring 75 which then contacts electrical contact 77 to close switch 37. Thus, if on/off switch 33 is closed, this will complete the circuit from power source 31 to turntable drive motor 30 enabling rotatable drive of turntable 18 and, due to the subsequent direct bearing engagement of lift bar 151 with protrusion 49 on pickup arm 41, sound will be reproduced from phonograph record playing surface 27. If desired, such mechanical reset may be accomplished in conjunction with the turning on and off of the drive motor 30 by means of a conventional mechanical interconnection between the on/off switch 33 for the power supply 31 for motor 30 which switch mechanical interconnection, by way of example, could also raise lift bar 48 in the direction of arrow 101 when the switch 33 was moved to the off position or, alternatively, raise lift bar 151 in the direction of arrow 103 when the switch 33 was moved to the off position, thereby insuring that record 26 or 27 will always start at the beginning thereof when the phonograph 10b is turned on. However, most preferably, the toy phonograph 10b of the embodiment of FIGS. 6–11 may be employed in a talking toy where selection of the message to be singly reproduced is desired. In such as instance, it may be conventionally arranged to provide a mechanical interconnection to raise lift bar 48 in the direction of arrow 101 to provide one message in response to one condition and, alternatively, a mechanical interconnection to raise lift bar 151 in the direction of arrow 103 to provide another message in response a different condition. Thus, by way of example, the dual record toy phonograph 10b of the embodiment of FIGS. 6–11 may provide a talking toy bank, such as illustratively shown in block form in FIG. 11.

In such an instance, the bank, generally referred to by the reference numeral 100, may preferably have a pair of conventional coin receiving slots 102 and 104, such as labeled "5¢" and "10¢", respectively. A central mechanical member 106 may be provided which is conventionally located between lift bar extension portions 57 and 59 and out of contact therewith. Preferably, if desired, conventional leaf springs 110 and 112 may be provided to maintain mechanical member 106 in its neutral position between lift bar extension portions 57 and 59. The insertion of an appropriate coin in coin receiving slot 102, for example, will provide a force which momentarily overcomes the neutralizing biasing forces of leaf springs 110 and 112 by applying downward pressure in the direction of arrow 103 so as to overcome these normal biasing forces of springs 110 and 112 and press contact member 106a of member 106 against lift bar extension 59 a sufficient amount to raise the lift bar 151 a sufficient amount to subsequently raise lift bar aperture 55 above protrusion 49 which was preferably previously seated therein and, thus, enable spring 69 to resiliently return pickup arm 41 to the periphery of record 27, thereby also closing switch 37 by contact of leaf spring 75 with contact 77. Since switch 33 has previously preferably been closed prior to insertion of the coin in slot 102, closure of switch 37 will complete the circuit from power source 31 to drive motor 30, thereby turning on the phonograph 10b and enabling a single play reproduction of the recorded message on phonograph record playing surface 27, with the phonograph 10b subsequently shutting off at the end of the recording 27 when the protrusion 49 again seats in lift bar aperture 55. Subsequently, if a different denomination coin, by way of example, is inserted in coin receiving slot 104, member 106 and springs 110 and 112 are preferably conventionally balanced so that the insertion of this coin through slot 104 will momentarily apply a force in the direction of arrow 101 sufficient to overcome the normal neutralizing biasing forces of springs 110 and 112 and raise extension portion 57 a sufficient amount above protrusion 47 to enable resilient return of pickup arm 40 to the periphery of the record 26 and the closure of switch 35 by contact of leaf spring 71 with contact 73, thereby enabling a single play reproduction of the message recorded on phonograph record playing surface 26, assuming on/off switch 33 was previously in the closed circuit condition. It should be noted that preferably the insertion of a coin through either slot 102 or 104 only supplies a momentary force in the direction of arrow 101 or 103, respectively, for a sufficient time to enable return of the respective pickup arm 40 or 41 to the periphery of the respective record 26 or 27 and, thereafter, conventionally drops into the coin receptacle portion 114 of the bank 100. This can be controlled in any conventional fashion such as by the positioning of the respective leaf springs 110 and 112 and the dimensions of the associated coin receiving slots 102 and 104, with the leaf springs 110 and 112 being located in coin receiving receptacles in communication with slots 102 and 104 at one end and in communication with coin receptacle 114 at the opposite end.

Each of the pickup arms 40 and 41 is preferably conventionally pivotally mounted, such as at pivot points 120 and 121, respectively, on the housing 12. As was previously described the pickup arms 40 and 41 are biased in conventional fashion into playing engagement with the respective phonograph records 26 and 27 playing surfaces via the respective speaker cone assemblies 44 and 45 with which they are in direct bearing engagement with a substantially uniform pressure throughout the path of travel of the needles 42-43 across the respective phonograph record playing surfaces 26, 27 due to the respective lift bar mechanisms 48 and 151 bearing against protrusions 47 and 49, respectively, due to springs 50, to enable reproduction of the recorded sound. Pickup arm 40 conventionally moves along its clockwise record groove towards the center of the record 26, the direction of the groove being indicated by arrow 124 in FIG. 6, to reproduce the sound recorded on the record 26 as the turntable 18, and hence the phonograph record 26, rotates due to the belt drive 28. Similarly, pickup arm 41 conventionally moves along its counterclockwise record groove towards the center of the record 27, the direction of the counterclockwise record groove being indicated by arrow 126 in FIG. 8, to reproduce the sound recorded on the record 27 as the turntable 18 and, hence, the phonograph record 27, simultaneously rotates due to the belt drive 28. Thus, the simultaneous drive of the common turntable 18 may enable sound reproduction from either record 26 or 27 or, if desired, from both records 26 and 27 simultaneously if both speaker cone assemblies 44 and 45 are, respectively, in direct bearing engagement with respective pickup arms 40 and 41 at the same time.

Summarizing the operation of the dual record toy phonograph 10b of the embodiment of FIGS. 6-11, the preferred starting condition for the phonograph 10b is with both the protrusion 47 seated in lift bar aperture 53 and the protrusion 49 seated in lift bar aperture 55. In this condition, both pickup arms 40 and 41 are at the end of the respective phonograph records 26 and 27 and switches 35 and 37 are both positively biased to the open circuit condition. Thus, closure of switch 33 will not turn on the device since both parallel switches 35 and 37 are being held in the open circuit condition, respectively, by pickup arm 40 bearing against leaf spring 71 and by pickup arm 41 bearing against leaf spring 75. Depending on the message to be reproduced either lift bar extension 57 or 59 is mechanically lifted, such as by insertion of a coin if the device is used as a bank 100, as previously mentioned, a sufficient amount so as to raise the associated lift bar aperture, 55 by way of example, a sufficient amount to unseat the respective pickup arm 49, by way of example. This enables the pickup arm 41 to be resiliently reset to the beginning of the phonograph record 27 and removes the bearing contact of the pickup arm 41 against the leaf spring 71 which then returns the switch 35 to the closed circuit condition as illustrated in FIG. 10. Thus, with switch 33 previously closed, this completes the circuit to drive motor 30 and turns on the rotatable drive of turntable 18. Since the upward mechanical force is then no longer present on extension 59, the lift bar 151 returns to direct bearing engagement with protrusion 49 on pickup arm 41 pressing it into engagement with the phonograph record playing surface 27, with a continuous substantially uniform pressure, reproducing the recorded sound therefrom with the pickup arm 41 along the groove towards the center of the record 27. When the pickup arm 41 reaches the center of the record 27, the protrusion 49 again seats in the lift bar aperture 55 which thereby overcomes the biasing force of leaf spring 75 and forces the switch 37 into the open circuit condition as well as removing the direct bearing contact of lift bar 151 with the protrusion 49 so that the needle 43 no longer contacts the phonograph record playing surface 27. This shuts off the phonograph 10b completing the single play since, as illustrated in FIG. 9, pickup arm 40 was previously situated within protrusion 47 seated in aperture 53 thereby holding switch 35 in the open circuit condition. Thus, both switches 35 and 37 are then in the open circuit condition and the phonograph 10b is automatically turned off.

Referring now to FIGS. 12-17, as well as to FIG. 11, still another embodiment of the improved toy phonograph of the present invention, generally referred to by the reference numeral 10c, which is similar to the aforementioned dual record toy phonograph embodiment 10b, shall be described. Preferably, all of the components of the previously described phonograph 10b of FIGS. 6-11 are identical with the components of the presently preferred embodiment 10c of FIGS. 12-17 with the exception of the switching mechanism 35-37 (FIGS. 6-11) for automatically cutting off the power supply from power source 31 to the turntable drive motor 30 which affects rotatable drive of turntable 18 and, correspondingly, simultaneous rotation of phonograph records 26 and 27. Thus, switches 35 and 37 are preferably replaced by switches 35a and 37a which are also leaf spring contact switches similar to switches 35 and 37; however, these switches 35a and 37a are preferably located in a different position in the embodiment of FIGS. 12-17 as well as functioning in a different manner in that they cooperate wit the respective lift bars 48 and 151 directly instead of with the pickup arms 40 and 41, as will be described in greater detail hereinafter. Accordingly, again identical reference numerals are employed for identically functioning components in the embodiment 10c of FIGS. 12-17 which identical components will not be described again in greater detail hereinafter except as to how they cooperatively function with the presently preferred switching arrangement 35a, 37a.

Figure 13:
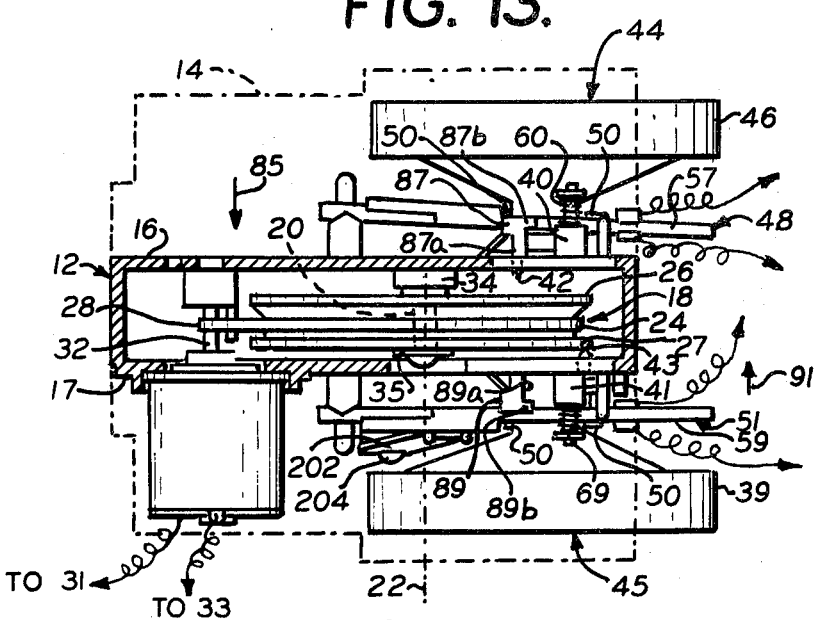
FIG. 13 is a partially cut-away side elevation similar to FIG. 7 of the embodiment of FIG. 12 with the cover shown in position in dotted lines.

Thus as shown by reference to FIGS. 12-17, switch 35a preferably comprises a conventional electrical leaf spring contact arrangement 171-173 which is preferably normally biased to the closed circuit condition and, as will be described in greater detail hereinafter, is forcibly held in the open circuit condition due to the lift arm 48 bearing against the leaf spring contact 171, as shown in FIGS. 13 and 15, thereby removing it from electrical contact against contact 173, which condition occurs when the pickup arm protrusion 47 on the pickup arm 40 is seated in the lift bar aperture 53. The switch 35a is preferably held in this open circuit position as long as the pickup arm protrusion 47 is seated in the lift bar aperture 53. The force which holds the lift bar 48 against leaf spring contact 171 to bias it into the open circuit position is primarily provided by means of the aforementioned leaf spring 50 which normally positively biases the entire lift bar mechanism 48 and the speaker cone 44 into engagement with the protrusion 47 on the pickup arm 40 with a substantially uniform pressure for enabling the aforementioned vibration of the speaker cone 44 during play. As is shown by FIGS. 13-15 and 16, a similar leaf spring electrical contact arrangement 175-177, which comprises switch 37a, by way of example, is provided on the opposite side with respect to pickup arm 41, lift bar 151 and phonograph record 27, with this leaf spring arrangement 175-177 being shown in the closed circuit condition in FIGS. 13-17, and particularly in FIGS. 15 and 16. In this closed circuit condition, as long as on/off switch 33 is closed, power will be supplied from power source 31, to the turntable drive motor 30, to effect rotatable drive of turntable 13, and correspondingly, simultaneous rotation of phonograph records 26 and 27. However, as long as the pikcup arm protrusion 47 is seated in the lift bar aperture 53, the needle 42 is not in contact with the phonograph record playing surface 26 and sound cannot thereby be reproduced from the phonograph record 26. However, as illustratively shown by way of example in FIG. 17, since the needle 43 associated with pickup arm 41 is in contact with the phonograph record playing surface 27 due to direct bearing contact between lift bar 151 and the protrusion 49 on the pickup arm 41, which bearing contact is resiliently maintained by leaf spring 50, sound will be reproduced from the phonograph record playing surface 27 from the counterclockwise groove recorded therein. Of course, if on/off switch 33 is manually moved to the open circuit condition, the phonograph 10c will not operate, irrespective of the open or closed condition of switches 35a and 37a defined by contacts 171-173 and 175-177, respectively. Moreover, if on/off switch 33 is in the closed circuit condition, and both switches 35a and 37a are in the open circuit condition, the toy phonograph 10c of the presently preferred embodiment shown in FIGS. 12-17 will not operate to produce sound since the turntable drive motor 30 will not be turned on. This latter condition preferably occurs when both pickup arms 40 and 41 have their respective protrusions 47 and 49 seated in lift bar apertures 53 and 55, respectively, with both of the pickup arms 40 and 41 located at the ends of the respective recordings associated with phonograph records 26 and 27, respectively, at which time respective lift bars 48 and 151 will be biased against leaf spring contacts 171 and 175, respectively, to hold these leaf spring contacts 171 and 175 in the open circuit condition as previously described. As will be described in greater detail hereinafter, this is the preferred off condition for the phonograph 10c such as when the phonograph 10c forms part of a talking toy bank as will be described in greater detail hereinafter, and as was also true for the previously described talking toy bank employing the embodiment of FIGS. 6-11. Thus, FIG. 11 represents a talking toy bank which may employ either the presently preferred embodiment 10c of FIGS. 12-17 or the previously described embodiment 10b of FIGS. 6-11 for the toy phonograph employed therein.

As shown and preferred in FIGS. 12-17, switches 35a and 37a are each preferably located at the beginning of the respective record or periphery of phonograph record 26 and 27, respectively, preferably directly beneath the beginning of the respective extension portions 57 and 59 of lift arms 48 and 151 respectively. Thus, assuming the toy phonograph 10c is in the aforementioned preferred off condition, when pickup arm 41, shown at the beginning of the record or periphery of phonograph record 27 in FIGS. 14, 15 and 17, reaches the end of the phonograph record 27, that is the end of the recording, which is conventionally located adjacent the center of the record 27, the protrusion 49 will seat in lift bar aperture 55 thereby removing the direct bearing contact of the speaker cone assembly 45 with the protrusion 49 on the pickup arm 41. In addition, this will enable lift bar to be forcibly lowered (without bowing) from the height of the protrusion 49 due to the substantially uniform positive biasing force downward of leaf spring 50 exceeding the normal upward biasing force of leaf spring contact 175 in the opposite direction. As a result, this opens switch 37a by separating electrical contacts 175 and 177 due to lift arm 151 bearing against leaf spring contact 175 to bias it to the open circuit condition. It should be noted that preferably leaf spring contacts 171 and 175 are normally biased to the closed circuit condition by being normally biased in a direction placing them into contact with electrical contacts 173 and 177, respectively, which normal biasing direction, as previously mentioned, is opposite to the normal biasing direction of leaf springs 50 located on the respective sides of phonograph 10c.

As was previously mentioned with reference to the embodiment of FIGS. 6-11, and as was described above, the lift arms 48 and 151 each preferably include the aforementioned integral extension portions 57 and 59, respectively, for enabling mechanical reset of the respective pickup arms 40 and 41 to the periphery of the records 26 and 27, respectively, either to initiate reproduction of the message recorded in the respective grooves on the phonograph records 26 and 27 or at any time during the play thereof, such as before the respective pickup arms 40 and 41 reach the end of the record. This function is in addition to the presently preferred function of these extension portions 57 and 59 which is to provide bearing pressure against the respective leaf spring contacts 171 and 175 to bias the respective switches 35a and 37a to the open circuit condition when the respective pickup arms 40 and 41 reach the end of the associated records 26 and 27 and the respective protrusions 47 and 49 seat in lift bar apertures 53 and 55, respectively. Thus, as previously mentioned, extension 57, by way of example, enables a force to be applied in the direction of arrow 101 at the end of extension portion 57 to lift the lift arm 48 out of bearing engagement with protrusion 47, thereby enabling spring 60 to resiliently return pickup arm 40 to the beginning or periphery of the record 26. Such resilient return also enables switch 35a to close due to leaf spring contact 171, being normally biased to the closed circuit condition, which normal bias force is no longer overcome by the bearing relationship of lift arm 48 against leaf spring contact 171. This bearing relationship is further prevented when the force applied to extension 57 is removed since the lift arm 48 once again now bears against protrusion 47 which in effect raises pickup arm 48 above leaf spring contact 171 so that it is not in bearing relationship therewith, such as shown by the condition of lift arm 151 in FIG. 15. Thus, if on/off switch 33 is closed, the closing of switch 35a will complete the circuit from power source 31 to turntable drive motor 30, thereby turning on motor 30 and rotatably driving turntable 18 and enabling reproduction of the recorded message from phonograph record playing surface 26 due to subsequent direct bearing contact of lift bar 48 against the protrusion 47 when the pickup arm 40 reaches the periphery of the phonograph 26. This direct bearing contact, as previously mentioned, also enables leaf spring contact 171 to be in electrical contact with contact 173 in the normal closed circuit condition. Similarly, extension 59 enables a mechanical force to be applied in the direction of arrow 103 at the end of extension portion 59 to lift the lift arm 151 out of bearing engagement with protrusion 49, thereby enabling spring 69 to resiliently return pickup arm 41 to the beginning or periphery of the record 27 as illustrated in FIG. 17. Similarly, since lift arm 151 does not then bear against leaf spring contact 175, switch 37a will close due to the failure to then overcome the normal biasing force of leaf spring contact 175 which then contacts electrical contact 177 to close switch 37a. Thus, if on/off switch 33 is closed, this will complete the circuit from power source 31 to turntable drive motor 30 enabling rotatable drive of turntable 18 and, due to the subsequent direct bearing engagement of lift bar 151 with protrusion 49 on pickup arm 41, sound will be reproduced from phonograph record playing surface 27. As was previously mentioned, if desired, such mechanical reset may be accomplished in conjunction with the turning on and off of the drive motor 30 by means of a conventional mechanical interconnection between the on/off switch 33 for the power supply 31 for motor 30 which switch 33 mechanical interconnection, by way of example, could also raise lift bar 48 in the direction of arrow 101 when the switch 33 was moved to the off position, or alternatively, raise lift bar 151 in the direction of arrow 103 when the switch 33 was moved to the off position, thereby insuring that record 26 or 27 will always start at the beginning thereof when the phonograph 10c is turned on.

Most preferably, the toy phonograph 10c of the presently preferred embodiment of FIGS. 12-17 may be employed in a talking toy where selection of a message to be singly reproduced is desired. In such an instance, it may be conventionally arranged to provide a mechanical interconnection to raise lift bar 48 in the direction of arrow 101 to provide one message in response to one condition and, alternatively, a mechanical interconnection to raise lift bar 151 in the direction of arrow 103 to provide another message in response to a different condition. Thus, by way of example, a dual record toy phongraph 10c of the presently preferred embodiment of FIGS. 12-17 may provide a talking toy bank such as previously described with reference to FIGS. 6-11 and such as illustratively shown in block form in FIG. 11. No further description of the talking toy bank of FIG. 11 other than that previously described with reference to the embodiment of FIGS. 6-11 is necessary for a sufficient understanding thereof except to say that the only difference in operation to that previously described relates to the manner in which the switches 35a and 37a are opened and closed as opposed to the manner in which switches 35 and 37 are opened and closed due to their different location and cooperative relationship. However, this difference in cooperative relationship has been adequately described above to be understood by one of ordinary skill in the art.

Figure 14:
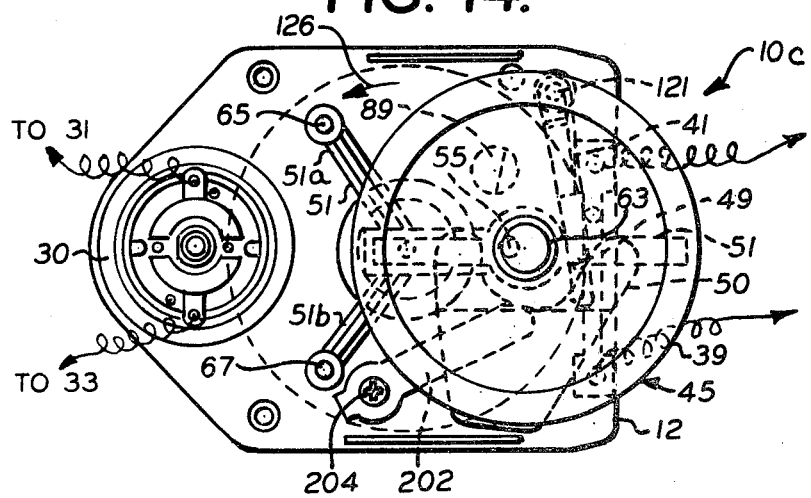
FIG. 14 is a bottom plan view of the embodiment of FIG. 12 with the cover removed, FIGS. 12 and 14 being top plan and bottom plan views, respectively, with respect to FIG. 13, with FIG. 14 also being a plan view a single record, single play, toy phonograph embodiment in accordance with the present invention.

Most preferably, the presently preferred toy phonograph 10c may be employed as a single record toy phonograph as opposed to the dual record toy phonograph described above. In such instance, the components thereof are identical with the exception that a second speaker assembly, such as speaker assembly 44, and a second lift bar 48, as well as all of the mechanism associated with the playing of the phonograph record 26, by way of example, is omitted with only one phonograph record, such as phonograph record 27 being mounted on the turntable 18. Thus, FIG. 14 represents a plan view of the single record embodiment as well as the bottom plan view of the dual record embodiment of the presently preferred toy phonograph 10c of the present invention. The operation of the single record embodiment is preferably identical with that previously described with respect to the dual record embodiment with the exception that only one switch, switch 37a by way of example, is connected in series with on/off switch 33 for providing power to the turntable drive motor 30 when leaf spring contact 171 is in the closed circuit and contacts contact 177. As was previously discussed for the dual record embodiment, and as is also true for the single record embodiment, switch 37a will be placed in the open circuit condition when lift arm 151 bears against leaf spring contact 175 when protrusion 49 is seated in lift bar aperture 55 in the manner described above with respect to the dual record embodiment. Thus, the toy phonograph 10c single record embodiment may also be employed in any talking toy where selection of the message to be singly reproduced is desired.

What is claimed is:
1. In a toy phonograph comprising a housing, said housing comprising a base, a turntable rotatably mounted on said base for rotation about an axis of rotation, a first phonograph record rotatably mounted to one side of said turntable for rotation therewith, said phonograph record having a periphery and a center, a first pickup arm pivoted at one end and having a needle means engageable with a playing surface of said first phonograph record, a first spring means, said first pickup arm being constantly placed under a force of said first spring means which urges said first pickup arm toward the periphery of said first phonograph record and a first speaker cone means resiliently mounted on said housing above said first pickup arm, said first speaker cone means comprising a first lift bar means removably engageable with said first pickup arm in sound reproducing contact; the improvement comprising means for resiliently pressing said first pickup arm needle means into engagement with said first phonograph record for reproducing recorded sound from said first phonograph record playing surface during rotation of said turntable, said pickup arm needle means circumscribing a path of travel across said first phonograph record playing surface from said periphery toward said center during said sound reproducing engagement, said pressing means comprising second spring means, said second spring means comprising a bifurcated spring member resiliently pressing against said lift bar means at a pair of spaced apart positions therealong, one of said positions being located substantially adjacent said phonograph record periphery and the other of said positions being located substantially adjacent said center, whereby said bifurcated spring member presses against said lift bar means substantially adjacent the limits of said path of travel of said pickup arm needle means for substantially uniformly resiliently biasing said lift bar means against said first pickup arm with a substantially uniform biasing force for exerting substantially uniform pressure on said needle means throughout said entire path of travel circumscribed by said needle means.

2. An improved toy phonograph in accordance with claim 1 wherein said bifurcated spring member comprises a substantially U-shaped spring member.

3. An improved toy phonograph in accordance with claim 1 wherein said pressing means further comprises third spring means having an adjustable biasing force, said third spring means resiliently biasing said second spring means against said lift bar means with said adjustable biasing force for adjustably varying said substantially uniform biasing force.

4. An improved toy phonograph in accordance with claim 1 wherein said bifurcated member comprises a base portion and a pair of spaced apart arm portions, said bifurcated member being connected to said housing at said base portion.

5. An improved toy phonograph in accordance with claim 4 wherein said bifurcated member base portion is connected to said housing at only one point of connection.

6. An improved toy phonograph in accordance with claim 1 wherein said toy phonograph further comprises a first cam means axially mounted on said turntable axis of rotation and fixedly rotatable therewith, a second cam means nestable with said first cam means for rotation therewith when in nested engagement therewith, said second cam means being a floating cam means comprising at least one lower peripheral cam surface, sloped with respect to said turntable, said first cam means having at least one congruent upper peripheral cam surface nestable with said second cam means at least one lower peripheral cam surface, third spring means resiliently urging said second floating cam means at least one lower peripheral cam surface into nesting engagement with said first cam means at least one upper peripheral cam surface, said second floating cam means comprising a first protrusion extending outwardly therefrom beneath said speaker cone means parallel to said phonograph record playing surface and being normally biased out of engagement with said speaker cone means by said third spring means, said pickup arm comprising a second protrusion extending upwardly therefrom substantially normal to said phonograph record playing surface and being pivotally movable with said pickup arm, said lift bar means enabling said speaker cone means to be urged out of engagement with said pickup arm by said second cam means as said nestable cam surfaces are driven out of nesting engagement, said second spring means resiliently urging said lift bar means into supporting contact with said pickup arm second protrusion, said lift bar means comprising a third protrusion extending downwardly therefrom substantially normal to said phonograph record playing surface and normally disposable above said rotating first protrusion when said lift bar means is in said supporting contact with said pickup arm second protrusion, said lift bar means further comprising an aperture for receiving said second protrusion therein, said second protrusion being pivotally movable with said pickup arm, said lift bar means aperture being located above said phonograph record adjacent the end of said phonograph record recording, said second protrusion being receivable in said lift bar means aperture when said pickup arm is adjacent the end of said phonograph record recording for enabling said resiliently urged lift bar means to drop a sufficient amount in the direction of said phonograph record to enable said first and third protrusions to become engageable for halting rotation of said second floating cam means when said pickup arm is adjacent the end of said phonograph record recording, said turntable and said first cam means still being rotatable when said first and third protrusions are in engagement, said rotating first cam means at least one upper peripheral cam surface being driven out of nesting engagement with said second cam means at least one lower peripheral cam surface during rotation of said turntable when said first and third protrusions are in engagement, said second cam means at least one sloped lower peripheral cam surface rising up said at least one sloped first peripheral cam surface as said cam surfaces are driven out of said nesting engagement to enable sufficient contact of said second cam means with said speaker cone means to overcome said second spring means biasing force and urge said speaker cone means out of engagement with said pickup arm to raise said lift bar means aperture above said second protrusion and enable said pickup arm to be resiliently reset to the periphery of said phonograph record by said first spring means while returning said lift bar means to said supporting contact with said pickup arm second protrusion, thereby disengaging said first and third protrusions.

7. An improved toy phonograph in accordance with claim 6 wherein said first cam means comprises a pair of said congruent nestable upper peripheral cam surfaces spaced apart from each other, and said second cam means comprises a corresponding pair of said sloped lower peripheral cam surfaces with each of said pair of upper peripheral cam surfaces being nestable in a corresponding one of said pair of sloped lower peripheral cam surfaces, both of said sloped lower peripheral cam surfaces substantially simultaneously rising up said corresponding sloped first peripheral cam surfaces as said cam surfaces are driven out of said nesting engagement for providing a distributed upward lift force for said speaker cone means for urging said speaker cone means out of engagement with said pickup arm.

8. An improved toy phonograph in accordance with claim 7 wherein each of said pairs of cam surfaces are substantially 180° apart for providing a substantially equal distributed lift force for said speaker cone means.

9. An improved toy phonograph in accordance with claim 8 wherein said upper peripheral cam surfaces of said pair thereof are substantially mirror images of each other and said lower peripheral cam surfaces of said pair thereof are substantially mirror images thereof.

10. An improved toy phonograph in accordance with claim 7 wherein said housing comprises an overhang portion parallel to said phonograph record and located adjacent the end of said phonograph record recording between said lift bar means and said phonograph record, said overhang portion being spaced above said phonograph record playing surface a sufficient amount for enabling said pickup arm to be removably retained thereunder when said pickup arm second protrusion is received in said lift bar means aperture while substantially enabling said pickup arm to be resiliently reset to the periphery of said phonograph record by said first spring means when said speaker cone means is urged out of engagement with said pickup arm to raise said lift bar means aperture above said second protrusion.

11. An improved toy phonograph in accordance with claim 10 wherein said overhang portion further comprises a stop member substantially normal thereto for stopping said pivotal movement of said pickup arm at the end of said phonograph record recording.

12. An improved toy phonograph in accordance with claim 10 wherein said lift bar means further comprises an extension portion thereof extending out of said housing for enabling manual resilient reset of said pickup arm to the periphery of said phonograph record by said first spring at any position of said pickup arm along said phonograph record playing surface by lifting said extension portion.

13. An improved toy phonograph in accordance with claim 12 wherein said phonograph comprises drive means for rotatably driving said turntable, said drive means having an on and an off state with said turntable only being driven in said on state, said drive means comprising switch means having an on position and an off position for selecting between said on and said off state, respectively, said extension portion being in operative engagement with said switch means and being liftable thereby when said switch means is in said off position, whereby said pickup arm resilient reset is enabled when said drive means is placed in said off state and said phonograph record recording starts at the beginning thereof when said switch means is subsequently placed in said on position for placing said drive means in said on state.

14. An improved toy phonograph in accordance with claim 7 wherein said lift bar means further comprises an extension portion thereof extending out of said housing for enabling manual resilient reset of said pickup arm to the periphery of said phonograph record by said first spring at any position of said pickup arm along said phonograph record playing surface by depressing said extension.

15. An improved toy phonograph in accordance with claim 7 wherein said phonograph comprises drive means for rotatably driving said turntable, said drive means having an on and an off state with said turntable only being driven in said on state, said drive means comprising switch means having an on position and an off position for selecting between said on and said off state, respectively, said extension portion being in operative engagement with said switch means and being depressable thereby when said switch means is in said off position, whereby said pickup arm resilient reset is enabled when said drive means is placed in said off state and said phonograph record recording starts at the beginning thereof when said switch means is subsequently placed in said onposition for placing said drive means in said on state.

16. An improved toy phonograph in accordance with claim 6 wherein said lift bar means further comprises an extension portion thereof extending out of said housing for enabling manual resilient reset of said pickup arm to the periphery of said phonograph record by said first spring means at any position of said pickup arm along said phonograph record playing surface by lifting said extension portion.

17. An improved toy phonograph in accordance with claim 1 wherein said first pickup arm comprises a first protrusion extending upwardly therefrom substantially normal to said first phonograph record playing surface and being pivotally movable with said first pickup arm, said first lift bar means comprising a first aperture for receiving said first protrusion therein, said first lift bar means aperture being located above said first phonograph record adjacent the end of said first phonograph record recording, said first protrusion being receivable in said first lift bar means aperture when said first pickup arm is adjacent the end of said first phonograph record recording for interrupting said reproducing of said recorded sound from said first phonograph record playing surface; drive means for rotatably driving said turntable for enabling said reproducing of said recorded sound from said first phonograph record; and bistate switch means for activating and deactivating said drive means dependent on the state of said switch means, said drive means being activated to rotatably drive said turntable in a first state of said switch means and being deactivated to halt said rotatable drive of said common turntable in a second state of said switch means, said switch means comprising means located between said first phonograph record playing surface and said first lift bar means and being cooperable with said first lift bar means for placing said switch means in said second state when said first pickup arm protrusion is received in said first lift bar means aperture.

18. An improved toy phonograph in accordance with claim 17 wherein said switch means comprises a leaf spring contact switch means comprising a first leaf spring contact and a second contact with said means located between said first phonograph record playing surface and said first lift bar means comprising said first leaf spring contact and being spaced from said first lift bar means out of engagement therewith and in closed circuit engagement with said second contact when said switch means is in said first state, said first leaf spring contact being normally resiliently biased into said closed circuit engagement with a predetermined biasing force, said lift bar means engaging said first leaf spring contact with said first spring biasing force which is in excess of said first leaf spring biasing force for disengaging said first leaf spring contact from said second contact for placing said switch means into said second state when said first pickup arm protrusion is received in said first lift bar means aperture, said second state being an open circuit between said first leaf spring contact and said second contact.

19. An improved toy phonograph in accordance with claim 18 wherein said first lift bar means comprises means for enabling said lift bar aperture to be raised above the first pickup arm protrusion received therein for enabling said pickup arm to be resiliently reset to the periphery of said phonograph record.

20. An improved toy phonograph in accordance with claim 19 wherein said lift bar raising means further disengages said first lift bar means from said first leaf spring contact for enabling said switch to return to said first state.

21. An improved toy phonograph in accordance with claim 19 wherein said lift bar aperture raising enabling means comprises an extension portion of said lift bar means extending out of said housing.

22. An improved toy phonograph in accordance with claim 17 wherein said first lift bar means comprises means for enabling said lift bar aperture to be raised above the first pickup arm protrusion received therein for enabling said pickup arm to be resiliently reset to the periphery of said phonograph record.

23. An improved toy phonograph in accordance with claim 22 wherein said lift bar aperture raising enabling means comprises an extension portion of said lift bar means extending out of said housing.

24. An improved toy phonograph in accordance with claim 23 wherein said first lift bar cooperable switch means is located adjacent said first phonograph record periphery and said lift bar aperture raising enabling means.

25. An improved toy phonograph in accordance with claim 22 wherein said first lift bar cooperable switch means is located adjacent said first phonograph record periphery and said lift bar aperture raising enabling means.

* * * * *